US009283895B2

(12) United States Patent
Sumi et al.

(10) Patent No.: US 9,283,895 B2
(45) Date of Patent: Mar. 15, 2016

(54) SANDWICH PANEL, METHOD OF FORMING CORE MATERIAL FOR SANDWICH PANEL, AND METHOD OF FORMING SANDWICH PANEL

(75) Inventors: Takehiko Sumi, Tokyo (JP); Sumio Nagai, Yamato (JP); Tadatoshi Tanji, Yamato (JP)

(73) Assignee: KYORAKU CO., LTD., Kyoto-shi, Kyoto (JP)

( * ) Notice: Subject to any disclaimer, the term of this patent is extended or adjusted under 35 U.S.C. 154(b) by 1244 days.

(21) Appl. No.: 13/125,667

(22) PCT Filed: Oct. 31, 2009

(86) PCT No.: PCT/JP2009/005807
§ 371 (c)(1),
(2), (4) Date: Jul. 5, 2011

(87) PCT Pub. No.: WO2010/050242
PCT Pub. Date: May 6, 2010

(65) Prior Publication Data
US 2011/0250384 A1   Oct. 13, 2011

(30) Foreign Application Priority Data
Oct. 31, 2008 (JP) .................................. 2008-282585

(51) Int. Cl.
*B32B 5/18* (2006.01)
*B32B 3/12* (2006.01)
(Continued)

(52) U.S. Cl.
CPC ................ *B60R 5/044* (2013.01); *B29C 44/569* (2013.01); *B29C 70/086* (2013.01); *B32B 3/12* (2013.01);
(Continued)

(58) Field of Classification Search
None
See application file for complete search history.

(56) References Cited

U.S. PATENT DOCUMENTS 3,086,899 A * 4/1963 Ingraham et al. ............. 428/116
4,134,243 A * 1/1979 Fries ............................... 52/596
(Continued)

FOREIGN PATENT DOCUMENTS

JP     55-67444 A    5/1980
JP     55067444 A    5/1980
(Continued)

*Primary Examiner* — David Sample
*Assistant Examiner* — Nicholas W Jordan
(74) *Attorney, Agent, or Firm* — Westerman, Hattori, Daniels & Adrian, LLP

(57) ABSTRACT

An object of the present invention is to provide a sandwich panel which is capable of securing its flexural or its shear rigidity as a whole and securing a compression rigidity of a core material itself, while at the same time of readily reducing the weight of the sandwich panel.
According to an aspect of the invention, there is provided a sandwich panel comprising two resin skin sheets, and a resin core material sandwiched between the two resin skin sheets and planarly adhered to each of the two resin skin sheets, said core material consists of an foamed resin with a predetermined expanding ratio and has a plurality of recesses each of which forms an opening formed on at least one surface thereof and extends inwardly to define an inner space closed by the corresponding skin sheet, the number of said recesses and the total area of the openings are determined in such a manner that the planer adhesion of at least one surface of the resin core material to the corresponding skin sheet is maintained, while at the same time solid portions of the foamed resin of the resin core material excluding said inner space formed by the plurality of recesses function to support a compressive load in the thickness direction of the resin core material, under the predetermined void volume allocated to said plurality of recesses in relation with said predetermined expanding ratio.

6 Claims, 14 Drawing Sheets

(51) Int. Cl.

| | | |
|---|---|---|
| *B60R 5/04* | (2006.01) | |
| *B32B 27/06* | (2006.01) | |
| *B29C 44/56* | (2006.01) | |
| *B29C 70/08* | (2006.01) | |
| *B32B 3/26* | (2006.01) | |
| *B32B 3/28* | (2006.01) | |
| *B32B 3/30* | (2006.01) | |
| *B32B 27/08* | (2006.01) | |
| *E04C 2/296* | (2006.01) | |
| *B32B 37/04* | (2006.01) | |
| *B32B 38/06* | (2006.01) | |
| *B60R 13/01* | (2006.01) | |
| *B60R 13/02* | (2006.01) | |
| *B60R 13/08* | (2006.01) | |

(52) U.S. Cl.
CPC . *B32B 3/266* (2013.01); *B32B 3/28* (2013.01); *B32B 3/30* (2013.01); *B32B 5/18* (2013.01); *B32B 27/065* (2013.01); *B32B 27/08* (2013.01); *E04C 2/296* (2013.01); *B32B 37/04* (2013.01); *B32B 38/06* (2013.01); *B32B 2250/40* (2013.01); *B32B 2305/022* (2013.01); *B32B 2307/542* (2013.01); *B32B 2307/546* (2013.01); *B32B 2605/003* (2013.01); *B32B 2605/08* (2013.01); *B60R 13/01* (2013.01); *B60R 13/0268* (2013.01); *B60R 13/0815* (2013.01); *Y10T 428/24165* (2015.01); *Y10T 428/24306* (2015.01); *Y10T 428/24331* (2015.01)

(56) References Cited

U.S. PATENT DOCUMENTS

| | | | | |
|---|---|---|---|---|
| 4,543,289 A | * | 9/1985 | Park | 428/304.4 |
| 4,826,723 A | * | 5/1989 | Brambach | 428/319.7 |
| 5,374,383 A | * | 12/1994 | Brambach | 264/54 |
| 5,589,243 A | * | 12/1996 | Day | 428/316.6 |
| 2002/0017805 A1 | * | 2/2002 | Carroll et al. | 296/189 |
| 2002/0031963 A1 | * | 3/2002 | Mead | 441/74 |
| 2002/0044267 A1 | * | 4/2002 | Ackerman et al. | 355/53 |
| 2005/0058824 A1 | * | 3/2005 | Fujimoto | 428/316.6 |
| 2007/0256379 A1 | * | 11/2007 | Edwards | 52/309.9 |
| 2008/0254261 A1 | * | 10/2008 | Tamada | 428/166 |

FOREIGN PATENT DOCUMENTS

| | | | |
|---|---|---|---|
| JP | 06-179236 A | 6/1994 | |
| JP | 6179236 A | 6/1994 | |
| JP | 07-171877 A | 7/1995 | |
| JP | 7171877 A | 7/1995 | |
| JP | 08-118462 A | 5/1996 | |
| JP | 8118462 A | 5/1996 | |
| JP | 2002-096379 A | 4/2002 | |
| JP | 2002096379 A | 4/2002 | |
| JP | 2002-225210 A | 8/2002 | |
| JP | 2002225210 A | 8/2002 | |
| JP | 2004-249607 A | 9/2004 | |
| JP | 2004249607 A | 9/2004 | |
| JP | 2005-132016 A | 5/2005 | |
| JP | 2005132016 A | 5/2005 | |
| JP | 2005224681 A | 8/2005 | |
| JP | 2006-103027 A | 4/2006 | |
| JP | 2006103027 A | 4/2006 | |
| JP | 2006-224681 A | 8/2006 | |
| JP | 2006-334801 A | 12/2006 | |
| JP | 2006334801 A | 12/2006 | |
| JP | 2008-055806 A | 3/2008 | |
| JP | 2008055806 A | 3/2008 | |
| JP | 2008-222208 A | 9/2008 | |
| JP | 2008222208 A | 9/2008 | |
| JP | 2008-247003 A | 10/2008 | |
| JP | 2008247003 A | 10/2008 | |
| WO | WO 2006106933 A1 | 10/2006 | |

* cited by examiner

SANDWICH PANEL, METHOD OF FORMING CORE MATERIAL FOR SANDWICH PANEL, AND METHOD OF FORMING SANDWICH PANEL

This is a national stage of PCT/JP09/005807 filed Oct. 31, 2009 and published in Japanese, which claims the priority of Japanese number 2008-282585 filed Oct. 31, 2008, hereby incorporated by reference.

TECHNICAL FIELD

The present invention relates to a sandwich panel, a method of forming a sandwich panel core, and a method of forming a sandwich panel, and more particularly to a sandwich panel whose weight can be easily reduced while assuring flexural rigidity or shear rigidity of the entire sandwich panel and, on the other hand, holding compression rigidity of a core itself, a method of forming a sandwich panel core that can readily adjust an expansion ratio and prevent poor strength, and a method of forming a sandwich panel.

BACKGROUND ART

A so-called sandwich panel has been conventionally used for many purposes such as transport machineries, e.g., automobiles or aircrafts, building materials, electrical device housings, sports/leisure, and others.

The sandwich panel has two skin material sheets and a core interposed between both the skin material sheets, and a laminated structure including the skin material sheet, the core, and the skin material sheet is a basic conformation, but the function required for the sandwich panel varies depending on each intended purpose.

For example, dressed lumber is further bonded to a front surface-side skin material sheet that provides the external appearance when a high value is attached to attractive appearance but very high strength is not required like an interior panel used for a bathroom, and the higher strength rather than attractive appearance is required when a high value is attached to a surface texture of the dressed lumber or an entire formed shape and an intended purpose is a building material.

In this regard, since a reduction of weight is required and strength is also required for interior material components for transportation machinery such as automobiles or aircrafts, especially a cargo floor board for a vehicle, a deck board, a rear parcel shelf, and others in light of improvement of fuel efficiency, a resin sandwich panel in which both skin material sheets and a core are made of a resin has been often used. In conventional examples, to cope with an outer shape for an intended use, such a sandwich panel is brought to completion by manufacturing both the skin material sheets and the core by, e.g., a cut process and assembling and bonding both the prepared skin material sheets and core.

On the other hand, the resin sandwich panel having both the skin material sheets and the core made of a resin is manufactured by various molding methods.

Patent Document 1 discloses a method of forming a resin sandwich panel by extrusion molding.

According to this molding method, each surface layer constituting the sandwich panel is extruded from a T-die, and each surface layer is welded by using melting heat of the molten surface layer, whereby the sandwich panel having excellent interlayer adhesive properties can be continuously manufactured.

Patent Document 2 discloses a method of forming a resin sandwich panel by injection molding.

According to this molding method, a necessary amount of a composition forming a skin layer in a sandwich panel having the skin layer and an internal layer made of different compositions, which is required for forming a thickness of the upholstery layer, is injected from a first cylinder, and then a composition forming the internal layer is injected from a second cylinder at a high rate, thereby molding the sandwich panel having the thin skin layer.

According to the method of forming the resin sandwich panel based on such injection molding, it is possible to manufacture not only a molded piece having a fixed cross-sectional shape but also a molded piece having a free outer shape whose cross-sectional shape changes, and restrictions on the shape of a molded piece are moderate as compared with the extrusion molding in this regard.

However, since the injection molding method adopts a conformation that a molten resin is formed by injecting the molten resin into a closed mold space and pressing the molten resin against a closed mold inner surface, molding a molded piece having a closed hollow portion therein by the injection molding method alone is technically difficult.

Meanwhile, for example, when utilizing the resin sandwich panel as a cargo floor lid of an automobile, since the resin sandwich panel is used for not only an attractive appearance but also an application of mounting heavy cargos on the cargo floor lid, rigidity for weight-bearing of the cargos (flexural rigidity in particular) is required, whereas a reduction in weight is demanded in terms of improvement of fuel efficiency, and a technical problem that achieving both high rigidity and reduction in weight is difficult, must be overcome.

Therefore, as the resin sandwich panel for such an intended use, a hard resin material having a high Young's modulus is adopted for each skin material sheet and, on the other hand, a dimension (a thickness of a core) of the core is increased and a gap between both the skin material sheets is enlarged as much as possible to raise a section modulus, and a foam material is adopted, a hollow portion is provided inside, or a piece having many recesses provided on a surface is adopted for the core itself in order to reduce its weight, for example.

In more detail, in the resin sandwich panel, provision of voids in the core to achieve a reduction in weight is roughly divided into two methods, i.e., foaming a resin to provide a limitless number of air bubbles inside as disclosed in, e.g., Patent Document 3 to Patent Document 7 and providing many concave portions on the surface of the resin material as disclosed in, e.g., Patent Document 8.

As the conformation that many concave portions are provided as disclosed in Patent Document 8, two resin sheets are used, each sheet has on the outer surface thereof a plurality of recesses constituted of annular ribs protruding toward each inner surface side, each of the plurality of recesses have a butt planar portion on the bottom, and a hollow portion is formed between the two resin sheets except a butt-welded portion by performing butt-welding in such a manner that the planar portions of the corresponding recesses on the respective two resin sheets are welded back to back.

Each of Patent Document 3 to Patent Document 7 discloses a sandwich structure constituted of at least a three-layer structure in which a foamed core is sandwiched between a pair of upper and lower skin materials.

Patent Document 3 discloses a point that carbon fiber reinforced sheets are bonded to both surfaces of resin foam consisting of a polyetherimide resin having an expansion ratio of approximately 15- to 30-fold by vacuum suction as an air-frame structure of an aircraft. Patent Document 4 to Patent Document 7 disclose a common sandwich structure for an interior material panel such as a deck board or a floor panel of an automobile. Patent Document 4 discloses a point that two molten parisons are positioned between split molds, a previously shaped foamed core such as polypropylene is arranged between the two molten parisons, and the foamed core is pressed against the split molds to be molded in a vacuum or pneumatic state. Patent Document 5 discloses a point that a softened material obtained by reheating a previously shaped back surface-side sheet material is mounted in a lower one of upper and lower split molds, then the back surface-side sheet material is vacuum-sucked to be formed through the lower mold, resin foam such as polyethylene is mounted on the back surface-side sheet material, and a softened material obtained by reheating a previously shaped front surface-side sheet material is mounted on the resin foam, and mold clamping is subsequently carried out while performing vacuum suction through the upper and lower molds, thereby molding a sandwich structure. Patent Document 5 further discloses a point that a molded piece having a lattice structure, a molded piece having a honeycomb structure, or a molded piece having an embossed structure previously formed by punching processing or injection molding is used in place of such a resin foam core and a sandwich structure is molded by the same manufacturing method.

Patent Document 6 discloses a point that a laminated structure is manufactured by integral press working using foamed beads of an acrylonitrile-styrene copolymer having an expansion ratio of four- to 12-fold as foam.

Patent Document 7 discloses a point that a multilayer panel is manufactured by press working using foamed beads of polystyrene as the foam like Patent Document 6.

On the other hand, Patent Document 8 discloses a sandwich panel having a resin core that has many recesses each having a circular truncated cone shape, the sandwich panel being molded based on extrusion molding using corrugated rolls. This sandwich panel has two resin skin material sheets and a thermoplastic resin core interposed between both the skin material sheets, the resin core has a pair of thermoplastic resin plates each having a plurality of circular truncated conical recesses tapered toward the inner side on the outer surface thereof. Each of the plurality of circular truncated conical recesses is formed by a plurality of protrusions provided on the surface of each corrugated roll, protrudes toward the inner surface side, and has a butt planar portion at the most tapered part. The core having a hollow rib structure can be formed by butt-welding the planar portions of the corresponding recesses on the pair of resin plates based on pressing force of the corrugated rolls.

According to the above-described sandwich panel, although a reduction in weight can be achieved by forming the air bubbles based on foaming or forming the recesses on the surfaces, the following technical problems remain.

At first, when a reduction in weight is attempted by the formation of air bubbles or the formation of recesses on the surfaces alone, other functions such as strength, heat insulating properties, sound absorbency, and the like are deteriorated.

In more detail, with regard to Patent Document 3 to Patent Document 7, for example, a reduction in weight can be readily achieved by simply increasing a fill of a foaming agent to raise the expansion ratio and, on the other hand, an adhesion area between the core and the skin material is not reduced since openings do not have to be formed in the surface of the core, whereas compression rigidity of the core itself is lowered because an unlimited number of air bubbles uniformly spread in the entire core.

Further, in the case of Patent Document 3 to Patent Document 7, although the heat insulating properties or the sound absorbency can be improved in the entire core by raising the expansion ratio, a desired rigidity distribution is hardly obtained since adjusting air bubble forming positions is difficult.

In particular, since a closed cell percentage tends to lower by raising the expansion ratio, the heat insulating properties are thus considerably decreased.

On the other hand, in case of Patent Document 8, a reduction in weight can be achieved by providing the concave portions and, on the other hand, the compression rigidity of the core itself can be assured by the annular ribs constituting each concave portion, whereas openings must be necessarily provided in the surface of the core. Therefore, an adhesion area between the core and the skin material is reduced, and the internal configuration of the core is complicated by increasing the number of the concave portions, whereby a special molding method will be required.

If the bonding area between the core and the skin material is reduced, the flexural rigidity or the shear rigidity of the entire sandwich panel is decreased. On the other hand, in a case where a bending load is imposed on the sandwich panel, since the maximum bending stress is produced in the skin material sheet at upper and lower ends, the core itself may be possibly destroyed or damaged even if a dimension of the core is assured and firm adhesive properties between the core and the skin sheet are also assured, and hence strength of the core itself must be assured.

Furthermore, in the case of Patent Document 8, although a desired distribution of the concave portions and a rigidity distribution can be obtained by adjusting a position, a shape, or a size of each protruding portion provided on a cavity of the mold, a void volume of each concave portion is unavoidably extremely larger than that of the air bubble obtained by foaming, and hence improving the heat insulating properties or the sound absorbency is difficult.

Second, obtaining the sandwich panel of good quality is difficult because of the method of forming a sandwich panel.

In more detail, like Patent Document 3 to Patent Document 7, although a chemical foaming technology or a physical foaming technology is generally used for forming air bubbles by foaming, foaming does not restrict the molding method for the core in both the technologies, and extrusion molding, injection molding, blow molding, or press molding can be utilized like an unfoamed core, but an increase in the expansion ratio creates difficulty in adjustment of the expansion ratio in case of the extrusion molding or the injection molding in particular, thereby making it difficult to obtain desired quality.

On the other hand, like Patent Document 8, when forming the recesses on the surface, adhesive properties of the pair of thermoplastic resin plates constituting the core are poor, and the sufficient flexural rigidity of the entire sandwich panel cannot be exercised.

In more detail, since the pair of resin plates are fed to a space between the corrugated rolls and pressing force is applied at this position to effect bonding, bonding of the pair of resin plates is close to point bonding rather than surface bonding, and a bonding time is short, whereby sufficient adhesive properties cannot be assured.

In this regard, according to molding using a so-called mold, a tapered angle, which is narrowed toward the inner side, must be provided to the plurality of recesses because of a restriction in the molding using the mold, but a sufficient welding time can be assured by mold clamping, and thus, such a problem does not possibly occur.

Patent Document 9 discloses a method for manufacturing a resin sandwich panel based on sheet molding (compression molding) which is one type of molding using a mold.

In more detail, skin material sheets and a core (dressed lumber according to circumstances) are arranged between two split molds, the skin material sheets and the core in the molds can be pressurized and formed by clamping the split molds, and the skin material sheets and the core can be welded, whereby the sandwich panel can be formed at a time in this regard.

However, to effect forming and welding by mold clamping, both the skin material sheets and the core must be molten. If the skin material sheets are turned out as a continuous sheet from, e.g., an original fabric roll, they must be reheated by, e.g., an infrared heater before being arranged in the split molds. When using the sandwich panel for an application as a structure due to such reheating, obtaining the sandwich panel with sufficient strength is difficult. In more detail, the welding strength of an outer peripheral parting line which is a welding part of the skin material sheets or welding strength between the skin material and the core is deteriorated due to an adverse effect of the above-described reheating on moldability, thereby lowering strength of the entire sandwich panel.

PRIOR ART DOCUMENTS

Patent Documents

The patent publication 1: Japanese Patent Laid-open Publication SHO55-67444

The patent publication 2: Japanese Patent Laid-open Publication 2005-132016

The patent publication 3: Japanese Patent Laid-open Publication 2002-225210

The patent publication 4: Japanese Patent Laid-open Publication 2006-334801

The patent publication 5: Japanese Patent Laid-open Publication 2008-247003

The patent publication 6: Japanese Patent Laid-open Publication 2008-222208

The patent publication 7: Japanese Patent Laid-open Publication 2005-224681

The patent publication 8: Japanese Patent Laid-open Publication 2006-103027

The patent publication 9: Japanese Patent Laid-open Publication HEI07-171877

SUMMARY OF THE INVENTION

Problems to be Solved by the Invention

In view of the above technical problems, an object of the present invention is to provide a sandwich panel which is capable of securing its flexural or its shear rigidity as a whole and securing a compression rigidity of a core material itself, while at the same time of readily reducing the weight of the sandwich panel.

In view of the above technical problems, another object of the present invention is to provide a sandwich panel which is capable of attaining a desired distribution of its rigidity, while at the same time of improving its heat insulating or sound absorbing properties.

In view of the above technical problems, still another object of the present invention is to provide a method of forming a core material for a sandwich panel and a method of forming a sandwich panel which are capable of readily adjusting an expansion ratio, while at the same time of preventing a generation of shortage of strength of the sandwich panel.

Means to Solve Technical Problems

In view of the above technical problems, according to an aspect of the invention, there is provided a sandwich panel comprising two resin skin sheets, and a resin core material sandwiched between the two resin skin sheets and planarly adhered to each of the two resin skin sheets, said core material consists of an foamed resin with a predetermined expansion ratio and has a plurality of recesses each of which forms an opening formed on at least one surface thereof and extends inwardly to define an inner space closed by the corresponding skin sheet, the number of said recesses and the total area of the openings are determined in such a manner that the planer adhesion of at least one surface of the resin core material to the corresponding skin sheet is maintained, while at the same time solid portions of the foamed resin of the resin core material excluding said inner space formed by the plurality of recesses function to support a compressive load in the thickness direction of the resin core material, under the predetermined void volume allocated to said plurality of recesses in relation with said predetermined expansion ratio.

In view of the above technical problems, according to an aspect of the invention, there is provided a sandwich panel comprising two resin skin sheets, and a resin core material sandwiched between the two resin skin sheets and planarly adhered to each of the two resin skin sheets, said core material consists of an foamed resin with a predetermined expansion ratio and has a plurality of recesses on at least one surface thereof each of which extends inwardly to define an inner space closed by the corresponding skin sheet, each of said plurality of recesses is defined by an annular rib forming an opening on at least one surface, the number and the annular shapes of said annular ribs are determined in such a manner that the planer adhesion of at least one surface of the resin core material to the corresponding skin sheet is maintained, while at the same time said annular ribs function to support a compressive load in the thickness direction of the resin core material, under the predetermined void volume allocated to said plurality of recesses in relation with said predetermined expansion ratio.

According to the sandwich panel including the above structure, the weight of the core material, and thus, the weight of the sandwich panel can be reduced by providing the core material made of foamed resin, and by providing a plurality of recesses, each of which forms an opening on at least one outer surface and inwardly extends to form an inner space closed by the corresponding skin sheet.

In such a case, the void volume can be readily varied by adjusting the amount of the foaming agent, and thus, the foams formed inside the core material, for example. While on the other hand, the method of forming the core material including recesses can be prevented from being specialized, or complicated by limiting the number, and thus, the volume of the plurality of recesses provided on at least one of the outer surface, as compared with a case where the void volume required for reducing the weight is secured only by providing the plurality of recesses.

In addition, the planar adhesion of the core material to the corresponding skin sheet can be secured through at least one outer surface under the given void volume allocated to the plurality of recesses in relation with the predetermined expansion ratio. While on the other hand, the number and the total open area of the plurality of recesses can be determined in such a way that the solid portions of the core material made of the foamable resin excluding the void volume formed by the plurality of recesses function to support the compressive load in the thickness direction of the core material.

Accordingly, the flexural rigidity or the shear rigidity of the sandwich panel itself can be secured, while the compression rigidity of the core material itself can be maintained, while at the same time the weight of the sandwich panel can be readily reduced.

In more detail, when trying to achieve an entire void volume required for a reduction in weight by using air bubbles formed by foaming alone, since the air bubbles are formed in the thermoplastic resin core, openings associated with the formation of the air bubbles are not formed in at least one surface that forms the bonding surface for the corresponding skin material sheet, whereas the expansion ratio necessarily increases, whereby the compression rigidity of the thermoplastic resin core in the thickness direction is reduced.

On the other hand, when trying to achieve the entire void volume required for a reduction in weight by using the recesses alone, the annular ribs constituting the recesses exercise a support function for a compressive load in the thickness direction of such a thermoplastic resin core, whereas an area of the openings formed in at least one surface increases. As a result, an adhesion area on at least the one surface with respect to the corresponding skin sheet is reduced, whereby the flexural rigidity or the shear rigidity of the entire sandwich panel is lowered.

Therefore, when attaining a reduction in weight of the sandwich panel, appropriately determining the number of the recesses, a size or a shape of each opening constituted of the annular rib, or an annular shape of the annular rib such as a thickness of the annular rib enables achieving both acquisition of the flexural rigidity or the shear rigidity of the entire sandwich panel and acquisition of the compression rigidity of the core itself.

According to a preferred configuration, said resin core material comprises a pair of thermoplastic resin plates, each of which includes a plurality of recesses each of which inwardly tapers in a converging manner and is constituted by said annular rib protruding at its inner surface side, each of said plurality of recesses includes an abutting portion at the most converged portion, whereby said core material is formed by welding the abutting portion of each of the plurality of recesses of one of the pair of the resin plates and that of the corresponding recess of the other of the pair of the resin plates, the surface of each of said pair of the thermoplastic resin plates is joined to the corresponding skin sheet.

According to a preferred configuration, each of said plurality of recesses includes a bottom, said abutting portion includes a plane abutting portion, and said core material is formed by welding the plane abutting portion of each of said plurality of recesses of one of said pair of resin plates to that of the corresponding recesses of the other of said pair of resin plates in a back to back configuration.

According to a preferred configuration, said abutting portion is formed by a peripheral portion of an opening formed on each of the surfaces opposed to each other of the pair of resin plates, said core material including perforated holes is formed by welding the abutting portion of each of said plurality of recesses of one of said pair of resin plates to that of the corresponding recess of the other of said pair of resin plates in a back to back configuration.

According to a preferred configuration, each of said plurality of recesses is shaped to be a truncated pyramid which includes a regular hexagon opening on an outer surface of said thermoplastic core material.

According to a preferred configuration, said plurality of recesses are disposed to be in a honeycomb pattern on said outer surface of the thermoplastic core material.

According to a preferred configuration, the relationship between the mean density (x) of said thermoplastic resin core material and the effective density (y) thereof meets a following equation and the expansion ratio of said thermoplastic resin core material is less than, or equal to 10-fold.

$$0.05x \leq y \leq 0.85x$$

According to a preferred configuration, said predetermined expansion ratio of the foams formed inside said thermoplastic resin core material is limited so as to secure the ratio of close-celled foams in accordance with an heat insulating characteristics required for said sandwich panel, while a distribution of said plurality of recesses on said at least one surface of said thermoplastic resin core material is determined in accordance with the rigidity required for said sandwich panel.

According to a preferred configuration, said annular shape of said annular rib includes a size and a shape of said opening formed by said annular rib, or a thickness thereof.

According to a preferred configuration, the number of said annular ribs is determined based on a total peripheral length and a total area of said opening formed by each of said annular ribs.

In view of the above technical problems, according to an aspect of the invention, there is provided a method of forming a thermoplastic resin core material for a sandwich panel sandwiched between two resin skin material sheets comprising steps of positioning foamed thermoplastic resin material in a molten state between a pair of split molds so as to protrude around an annular pinch-off portion formed a peripheral edge portion of each of said pair of split molds, clamping said pair of split molds to form a sealed space inside said pair of split molds, and forming the thermoplastic resin material by means of protrusions provided on an inside of said pinch-off portion of a cavity of at least one of said pair of split molds by pressurizing and/or sucking the foamed thermoplastic resin material in a molten state inside said sealed space so as not to rupture foams formed in the foamed thermoplastic resin material, whereby recesses are formed on at least one surface of the thermoplastic resin material inside the sealed space which surface is opposed to said cavity.

According to the method of forming the thermoplastic resin core material for the sandwich panel including the above structure, the expansion ratio can be limited by relying on the void volume formed by the plurality of recesses on the surface of the core material, as compared with a case where the weight of the sandwich panel is reduced only by forming infinite number of foams inside the core material. This causes a difficulty of an adjustment of the expansion ratio due to the increase of the expansion ratio to be evaded. While on the other hand, good adhesion properties can be secured by welding the core material and the skin sheet using the pair of molds. Accordingly, the expansion ratio can be readily adjusted, while at the same time shortage of the strength of the sandwich panel can be prevented from being generated.

According to a preferred configuration, said foamed molten thermoplastic resin material is a cylindrically extruded parison.

According to a preferred configuration, said foamed molten thermoplastic resin material is a parison in a sheet form extruded from a T-die.

According to a preferred configuration, said foamed molten thermoplastic resin material is made to be in a molten state by reheating the foamed thermoplastic resin material which has been formed in advance by extrusion molding.

According to a preferred configuration, the thermoplastic resin material is formed into the foamed parison by adding foaming agent in an extruder in an amount required for the predetermined expansion ratio and kneading it while at the same time heating it so as to form foamed resin in a molten state, and extruding said foamed resin at a predetermined extruding velocity.

In view of the above technical problems, according to an aspect of the invention, there is provided a method of forming a thermoplastic resin core material for a sandwich panel sandwiched between two resin skin material sheets comprising steps of: positioning two foamed thermoplastic resin sheet parisons in a molten state between a pair of split molds so as to protrude around an annular pinch-off portion formed on a peripheral edge portion of each of said pair of split molds, forming a sealed space between a cavity of each of said pair of split molds and the corresponding sheet parison by abutting the corresponding sheet parison against said annular pinch-off portion provided on said cavity so as to protrude from said cavity toward the other split mold, forming each of the sheet parisons by pressing it against a plurality of protrusions provided on an inside of the corresponding pinch-off portion by sucking it through the sealed space, and welding said two sheet parisons to each other by clamping said pair of split molds, whereby a sealed space is provided inside the two sheet parisons, while at the same time a plurality of recesses or perforated holes are provided on a surface of each of the two sheet parisons by forming a parting line on peripheral edges of the two welded sheet parisons.

In view of the above technical problems, according to an aspect of the invention, there is provided a method of forming a thermoplastic resin core material for a sandwich panel sandwiched between two resin skin material sheets comprising steps of positioning foamed thermoplastic resin material in a molten state between a pair of split molds so as to protrude around an annular pinch-off portion formed on a peripheral edge portion of each of said pair of split molds, forming a sealed space inside said pair of split molds by clamping said pair of split molds, and forming the thermoplastic resin material by protrusions provided inside the annular pinch-off portion of a cavity of at least one of said pair of split molds by sucking the foamed thermoplastic resin material parison in a molten state inside the sealed space through said pair of clamped split molds, whereby recesses are formed on at least one surface of the thermoplastic resin material opposed to said cavity inside the sealed space.

In view of the above technical problems, according to an aspect of the invention, there is provided a method of forming a thermoplastic resin core material for a sandwich panel sandwiched between two resin skin sheets comprising steps of positioning foamed thermoplastic resin material in a molten state between a pair of split molds so as to protrude around an annular pinch-off portion formed on a peripheral edge portion of each of said pair of split molds, and clamping said pair of split molds to form the thermoplastic resin material by protrusions provided on a cavity of at least one of the pair of split molds inside said annular pinch-off portion thereof, whereby recesses are formed on at least one surface of the thermoplastic resin material inside a sealed space opposed to said cavity.

In view of the above technical problems, according to an aspect of the invention, there is provided a method of forming a sandwich panel including a thermoplastic resin core material sandwiched between two resin skin material sheets comprising steps of: positioning the core material formed by the method of forming the thermoplastic resin core material according to any of claims 8 to 14 between the pair of split molds, positioning two molten sheet parisons made of thermoplastic resin between the pair of split molds so as to sandwich the core material and protrude each of two molten sheet parisons from a corresponding annular pinch-off portion formed on a peripheral edge portion of a cavity of each of the pair of split molds, clamping the pair of split molds to form a sealed space inside the pair of split molds, and forming the sheet parisons in the sealed space by means of convex and concave portions provided on the cavity of each of the pair of split molds inside the corresponding annular pinch-off portion by pressurizing air inside the sealed space, or sucking the sealed space through the pair of clamped split molds, while at the same time welding the sheet parison and the core material, whereby a parting line is formed on peripheral edges of the sheet parisons welded to each other with the core material being arranged inside.

In view of the above technical problems, according to an aspect of the invention, there is provided a sandwich panel comprising an foamed resin core material on each surface of which a resin skin sheet is adhered, characterized in that a plurality of recesses are formed on said foamed resin core material.

In view of the above technical problems, according to an aspect of the invention, there is provided a method of producing a sandwich panel comprises steps of forming a plurality of recesses on an foamed core material by means of a plurality of protrusions protruding from at least one surface of a pair of split molds spaced apart from each other by a predetermined distance, and sandwiching said foamed resin core material between two resin skin sheets to adhere its area other than that corresponding to said plurality of recesses to the corresponding resin skin sheet.

DETAILED DESCRIPTION OF EMBODIMENTS OF THE INVENTION

Embodiments of a core material made of a thermoplastic resin for a sandwich panel, a method of forming such a core material, the sandwich panel including such a core material, and a method of forming the sandwich panel according to the present invention will be explained in detail with reference to the drawings.

The sandwich panel of the present invention can be suitably used as a structure member with a high flexible rigidity or a high bending buckling strength for an automobile, an air plane, a vehicle or a vessel, a building member, housings for various kinds of home electric appliances, and in sport/leisure. In particular, a fuel cost can be reduced due to the structure member with a light weight for automobiles. More specifically, the sandwich panel of the present invention can contribute to the reduction of the weight of the structure member for an inner panel such as a cargo floor lid, a deck board, a rear parcel shelf, a roof panel, and a door trim, a door inner panel, a plat form, a hard top, a sun roof, a bonnet, a bumper, a floor spacer, and an impact absorbing pad disposed under a foot of an occupant. The shape of the sandwich panel can be appropriately determined in accordance with an object of a product to which the sandwich panel is applied.

In this embodiment, the sandwich panel with a light weight and a high rigidity which is used for a cargo floor lid of an automobile will be described by way of an example.

Figure 1:
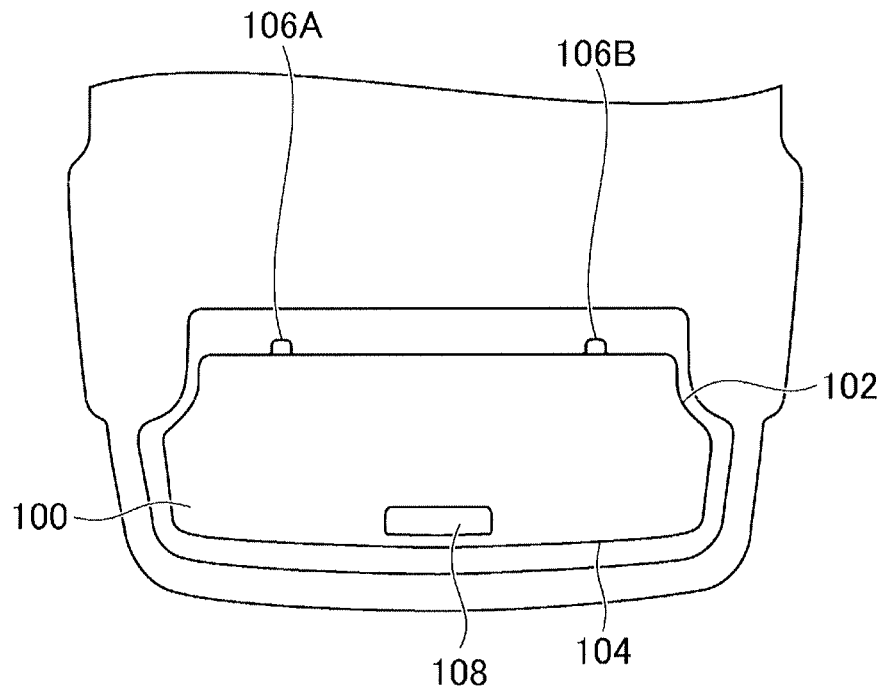
FIG. 1 is a view showing a situation in which the sandwich panel 10 according to the first embodiment of the present invention is applied to a cargo floor lid of an automobile.

As shown in FIG. 1, the cargo floor lid 100 for the automobile requires a complicated profile because it has to be accommodated in a limited rear space. More specifically, a curved portion 102 with a small curvature for evading a tire house, a curved portion 104 with a large curvature along a rear shape of the automobile, and a local protrusion portion 106 constituting a hinge portion for closing and opening the cargo floor lid are necessary. In addition, a concave portion 108 on its surface constituting a gripping portion a driver grips to close and open the cargo floor lid. Further, a light weight is required for the cargo floor lid in order to reduce the fuel cost, so that the thickness of the cargo floor lid is limited, while a high stiffness (a high flexural rigidity, in particular) is required because heavy articles such as luggage are rested on its upper surface.

Figure 2:
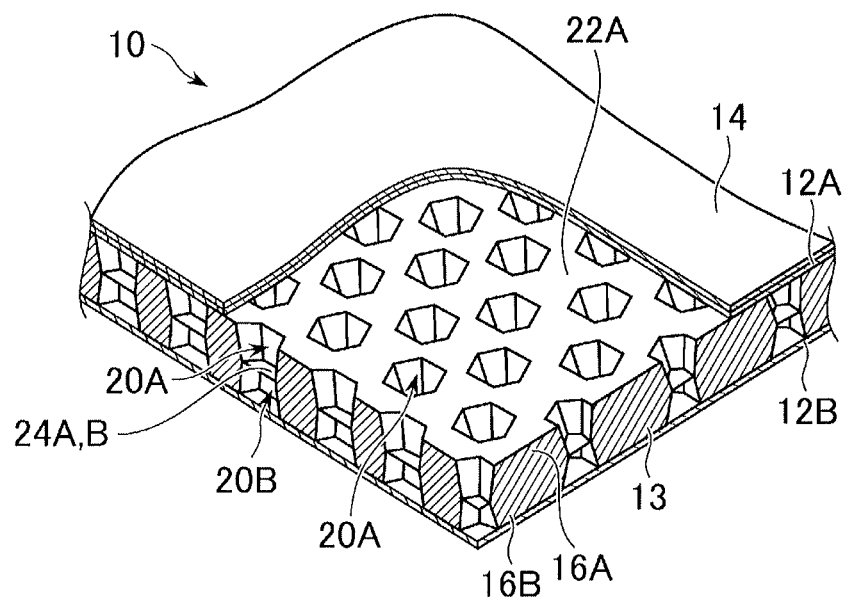
FIG. 2 is a cross perspective view showing a part of the sandwich panel 10 according to the first embodiment of the present invention in a broken manner.

As shown in FIG. 2, the sandwich panel 10 comprises a face side skin sheet 12A, an underside skin sheet 12B, a core material 13 interposed therebetween, and a decoration sheet 14 which is attached on an outer surface of the face side skin sheet 12A. The sandwich panel 10 is a laminated structure of the decoration sheet 14, the face side skin sheet 12A, the core material 13, and the underside skin sheet 12B.

The core material 13 is made of resin to which an foaming agent is added. The core material 13 may be made of thermoplastics including polyolefin (polypropylene, high-density ethylene, for instance) which is a homopolymer or copolymer of olefin such as ethylene, propylene, butene, isoprenepentene, methylpentene, etc., polyamide, polystyrene, polyvinyl chloride, polyacrylonitrile, acrylic resin such as copolymer of ethylene-ethyl acrylate, etc., polycarbonate, copolymer of vinyl acetate resin such as copolymer of ethylene-vinyl acetate, inonomer, terpolymer such as ethylene-propylene-diene, etc., acrylonitrile-styrene copolymer, ABS resin, polyolefinoxide, polyacetal, thermoplastic polyimide, etc., or made of thermoset including phenolic resin, melamine resin, epoxy resin, polyurethane, thermoset polyimide.

In this connection, a single kind of the above thermoplastics may be used, or two or more kinds thereof may be blended. In particular, the core material 13 and the skin sheet 12 can be thermally welded to each other without using solvent by making the resin material of the core material 13 same as that of the skin sheet 12. Additive including inorganic filler such as silica, mica, talc, calcium carbonate, glass fiber, carbon fiber, etc., plasticizer, stabilizer, color, antistatic, flame-retardant, foaming agent may be added to the core material 13.

In particular, resin comprising polyolefin or mainly olefin resin, or polypropylene may be preferable, since a good balance among adhesion properties to the fiber layer, a mechanical strength, and the molding properties is maintained. With respect to polyolefin resin, polypropylene the melt tension of which at the temperature of 230° C. is between 30 mN and 350 mN may be adopted. With respect to polypropylene, propylene homopolymer, ethylene-propylene block copolymer, ethylene-propylene random copolymer, and the mixture of these may be adopted.

Physical foaming agent, chemical foaming agent, or the mixture of these agents may be adopted to the present invention. Non-organic physical agent such as air, carbon acid gas, nitrogen gas, and water, and organic physical agent such as butane, pentane, hexane, dichloromethane, dichloroethane, and supercritical fluid derived from these may be adopted. Supercritical fluid may be produced based on carbon dioxide, nitrogen, etc. In case of nitrogen, the critical temperature of 149.1° C., and the critical pressure of higher than 3.4 MPa may be adopted, while, in the case of carbon dioxide, the critical temperature of 31° C., the critical pressure of higher than 7.4 MPa may be adopted.

An amount of the foaming agent may be determined in such a way that a desired void volume may be obtained by an infinite number of foams formed inside the core material 13 by the expansion action, while, the rigidity of the core material 13 resisting the compression load in the direction perpendicular to the adhesion surface of the core material 13 to the skin sheet 12 may not be reduced more than required due to the too high expansion ratio, or the heat insulating property of the core material 13 may not be deteriorated due to the decrease of the ratio of close-celled foams caused by the too high expansion ratio. More specifically, in view of reducing the weight of the sandwich panel 10 as a whole, the entire void volume required for the core material 13 is determined, and then, this is allocated to an infinite number of foams inside the core material 13 and the void volume formed by the plurality of recesses formed on the surface of the core material 13, whereby the expansion ratio, or the amount of the foaming agent to be added may be determined based on the void volume allocated to the infinite number of foams.

The core material 13 comprises a pair of thermoplastic resin plates 16 each of which includes a plurality of recesses 20 on an outer surface 22 each of which tapers toward a side of an inner surface 18 in a converging manner. Each of the plurality of recesses 20 includes a bottom and an butt planar portion 24 at the most converged point. The core material 13 is formed by welding the butting plain portion 24 of each of the plurality of recesses 20 in one of the pair of thermoplastic resin plates 16 to the corresponding butting plain portion 24 of each of the plurality of recesses 20 in the other of the pair of thermoplastic resin plates 16 in back to back manner. A portion in which the recesses are not formed in each of the pair of thermoplastic resin plates 16 is welded to the corresponding skin sheet 12 in a surface to surface contact manner.

Figure 3:
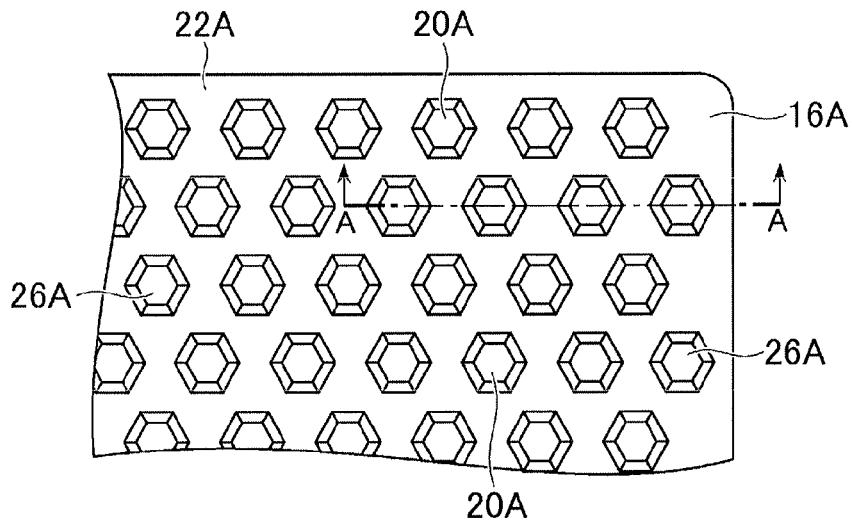
FIG. 3 is a front view showing a core material for the sandwich panel according to the first embodiment of the present invention.

As shown in FIG. 3, each of the plurality of recesses 20 is shaped to be a truncated pyramid whose opening 26 on the outer surface 22 of the core material is a regular hexagon. The openings 26 are arranged on the outer surface 22 in a honeycomb pattern. This allows for the plurality of recesses 20 to be arranged on the outer surface 22 of the core material 13 in the most dense manner. With respect to a size of the opening 26, a depth of each of the plurality of recesses 20, and a distance between adjacent recesses 20, the bigger the size of the opening 26 becomes, the deeper the depth of the dent 20 becomes, and the smaller the distance of the adjacent recesses 20 becomes, the more the void volume as an entire core material 13 can be improved to reduce its weight, while it is necessary to determine them along with a tapering angle of the dent 20 described below, in view of its stiffness required for an entire sandwich panel 10.

More specifically, each of the plurality of recesses 20 formed on the core material 13 is shaped to inwardly taper in a converging manner. The width (D1) of the opening of each of the recesses 20 and the width (D2) of the thin portion 5 constituting a bottom of each of the recesses 20 are appropriately determined in accordance with the thickness of the core material 13. D1 may be between 5 mm and 50 mm, more preferably, 5 mm and 25 mm, while D2 may be between 1 mm and 30 mm, more preferably, 1 mm and 15 mm.

Alternatively, it is preferable that the plurality of recesses 20 be uniformly distributed on the outer surface 22 of the core material and that the shape of the recesses 20 be appropriately selected from the various shapes such as a truncated cone, a truncated pyramid, conical shape, cylindrical shape, or hemispherical shape.

In a case where each of the pair of thermoplastic resin plates 16 is formed by forming a parison P in a molten state positioned between a pair of split molds 50 and closing the pair of split molds 50, as described below, the core material 13 is so formed as to include a sealed space 28 inside at a desired position and to exhibit a desired surface shape, in accordance with an application of the sandwich panel 10, while the core material 13 can be welded to the corresponding thermoplastic resin skin sheet 12 via its surface pressed toward a cavity 52 of the pair of split molds 50, whereby the core material 13 with a desired profile, a desired surface shape, and a desired inner structure, in accordance with the application of the sandwich panel 10 can be provided. In particular, a parting line PL is formed to contribute to improving the stiffness of the entire sandwich panel by welding the peripheral edge faces of the opposed thermoplastic resin skin sheets 12 between which the core material 13 is interposed.

In this connection, the butt plane portion 24 may be formed by the peripheral edge portion of the opening formed on the surfaces of the pair of thermoplastic resin plates 16 opposed to each other, so that the core material 13 including perforated holes may be formed by welding the butt portion of each of the plurality of the recesses 20 of the one of pair of thermoplastic resin plates 16 and the corresponding butt portion of each of the plurality of the recesses 20 of the other of pair of thermoplastic resin plates 16 in an opposed manner.

Figure 4:
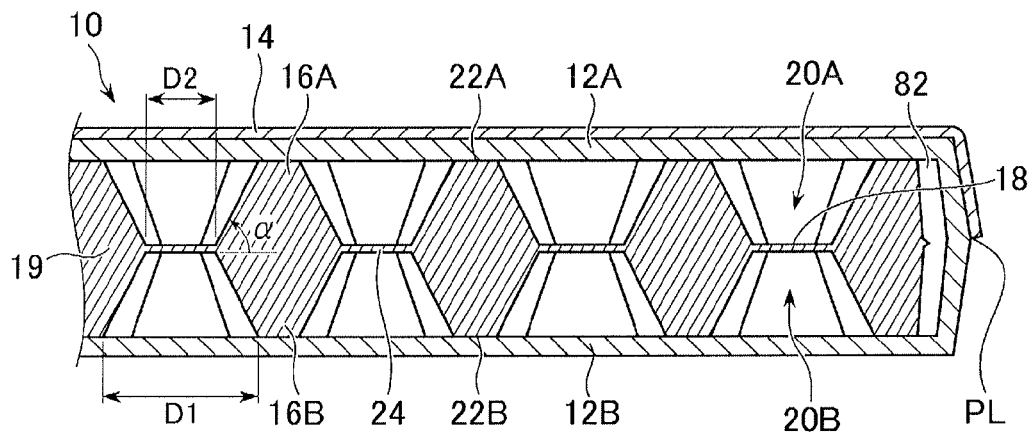
FIG. 4 is a cross sectional view taken along a line A-A in FIG. 3.
Figure 5:
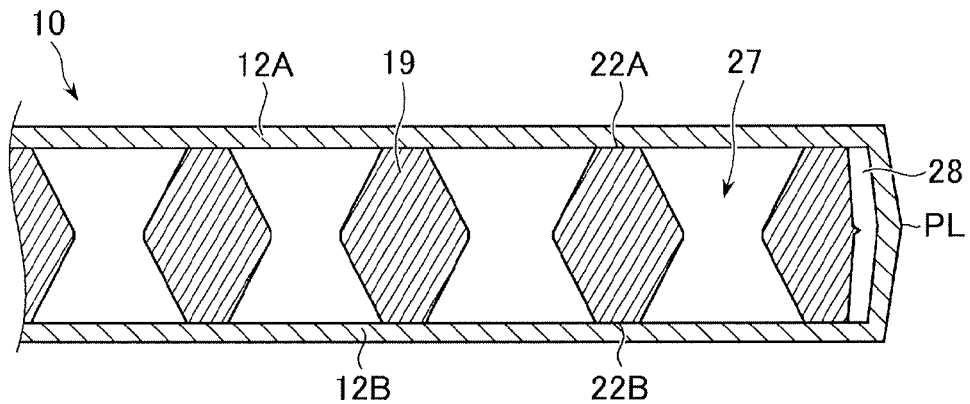
FIG. 5 is a cross sectional view same as FIG. 4 showing an alternative sandwich panel.
Figure 22:
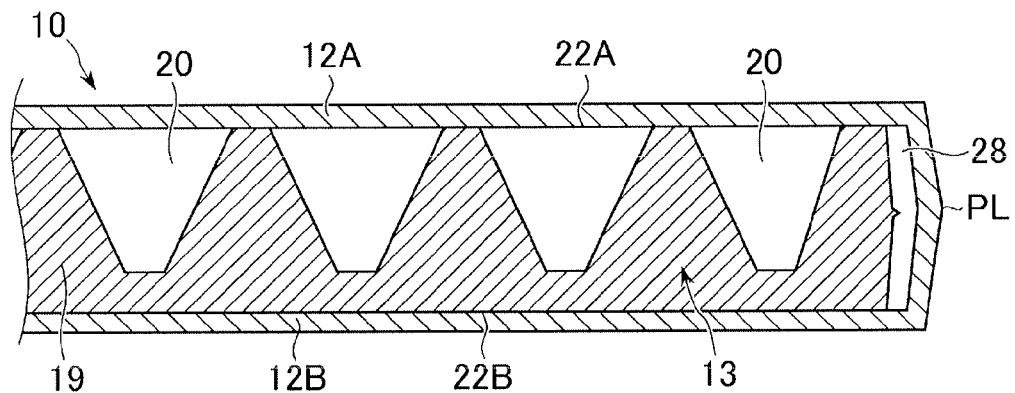
FIG. 22 is a view similar to FIG. 4 showing another embodiment of the present invention.

Alternatively, as shown in FIG. 5, the perforated holes 27 may be formed by removing a thin portion shown in FIG. 4. Further, a void volume may be improved by providing a hollow portion in a solid portion between adjacent recesses 20. Still further, as shown in FIG. 22, the plurality of recesses 20 may be provided on only the outer surface 22A of the core material 13 in such a way that the depth of each of the plurality of recesses 20 may not extend to the other outer surface 22B.

Figure 23:
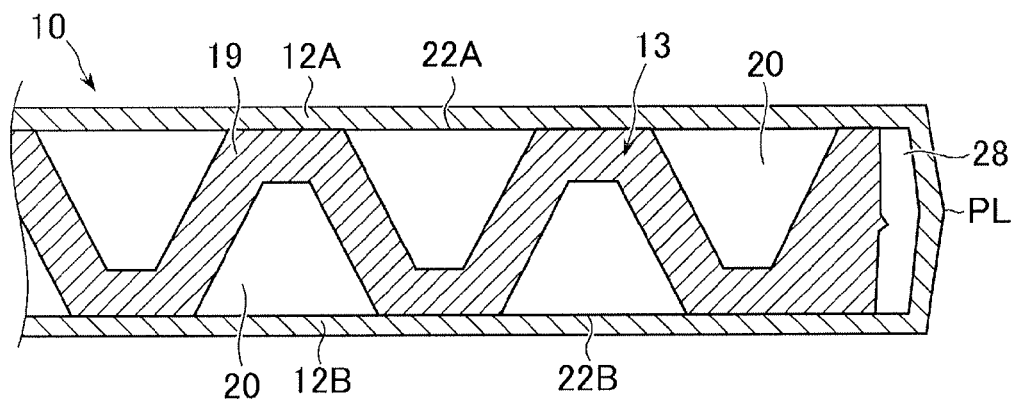
FIG. 23 is a view similar to FIG. 4 showing still another embodiment of the present invention.

Even further still, as shown in FIG. 23, in a case where the plurality of recesses 20 are provided on both of the outer surfaces 22A,22B, unlike FIGS. 4 and 5, the plurality of recesses 20 on the outer surface 22A and those on the outer surface 22B may be provided in an alternate manner in such a way that the depth of each of the plurality of recesses 20 on either of the outer surfaces 22A,22B may not extend to the other outer surface.

Figure 24:
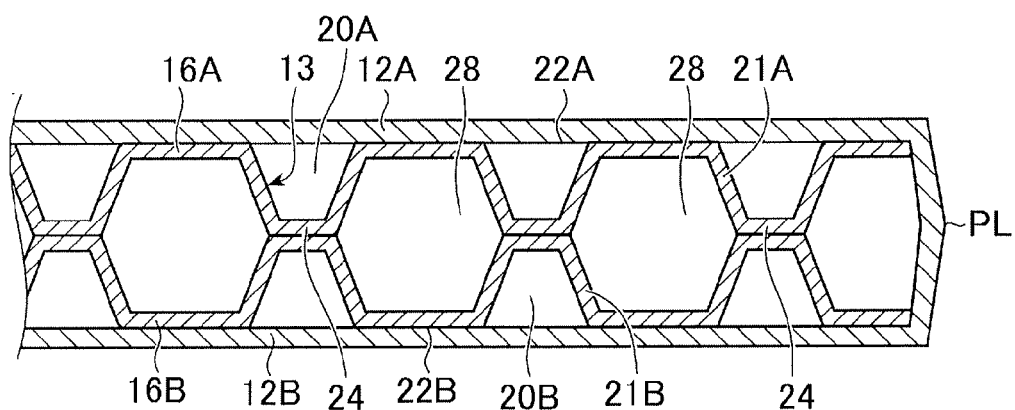
FIG. 24 is a view similar to FIG. 4 showing still another embodiment of the present invention.

Even further still, as shown in FIG. 24, in a case where the plurality of recesses 20 are provided on both of the outer surfaces 22A,22B, unlike FIGS. 4 and 5, hollow portions 28 may be provided in the portion other than the plurality of recesses 20, instead of the solid portions 19. In such a case, each of the plurality of recesses 20 may be defined by an annular rib 21. Sizes and shapes of the openings 26 on the outer surfaces 22A, 22B formed by the plurality of recesses 20, annular shapes of the annular ribs 21 such as their thicknesses, and the number of the annular ribs 21 may be appropriately determined under the total void volume allocated to the plurality of recesses 20 in relation with the expansion ratio of the foams formed inside the core material 13. This allows for securing a planar adhesion between each of the outer surfaces 22A, 22B of the core material 13 and the corresponding skin sheet 12, while at the same time resisting a compression load in the thickness direction of the core material 13.

In view of reducing the weight of the sandwich panel 10 by decreasing the effective density of the core material due to the formation of the plurality of recesses 20 on the core material 13, it may be preferable that the relationship between the mean density (x) of the core material 13 and the effective density (y) thereof meet the following equation.

$$0.05x \leq y \leq 0.85x$$

The mean density (x) of the core material 13 is calculated by the fact that the weight of the core material 13 is divided by the volume of the core material 13 excluding spaces formed by the plurality of recesses 20 and the hollow portions 19. The volume of the core material 13 excluding spaces formed by the plurality of recesses 20 and the hollow portions 19 can be measured by immersing the core material 13 cut into a predetermined size (a sample with 10 cm×10 cm for measure cut in the direction perpendicular to its thickness direction, for instance) into a water at 23° C. The effective density (y) of the core material 13 is calculated by the fact that the weight of the core material 13 is divided by the virtual volume of the core material 13 including spaces formed by the plurality of recesses 20. In other words, since the core material 13 of the sandwich panel 10 is sandwiched between the two skin sheets 12, the effective volume the core material 13 between the two skin sheets occupies includes the spaces formed by the plurality of recesses 20. The effective density (y) can be obtained by adding the volumes of all the recesses 20 and the hollow portions 19 to the volume of the core material 13 measured by immersing the core material 13 cut into a predetermined size into a water at 23° C., as described above. In this connection, the volume of the core material 13 may be calculated based on the outer shape of the core material 13 in a more simple manner.

In a case where the effective density (y) is not so small as compared to the mean density (x) of the core material 13 (y>0.85x), the reduction of the weight by the recesses 20 cannot be attained. While on the other hand, in a case where the effective density (y) is extremely small as compared to the mean density (x) of the core material 13 (y<0.05x), the ratio of the occupation of the recesses 20 increases too much, so that the adhesion strength of the core material 13 on the skin sheet can be deteriorated, whereby the rigidity of the sandwich structure can be worsened.

In addition, the expansion ratio of the core material 13 can be appropriately adjusted up to about 30 times (the mean density: 0.03 g/cm$^3$ under polypropylene with specific gravity of 0.90 g/cm$^3$), however, it may be less than or equal to 10 times, more preferably, less than or equal to 5.0 times, in view of attaining the sandwich panel 10 with a light weight and a high rigidity. Although the maximum shear stress can be generated on the core material 13 constituting an intermediate layer in the sandwich panel 10, the core material 13 can resist the shear stress and the compression load in the thickness direction, so that the collapse of the core material 13 can be prevented by adjusting the relationship between the effective density (y) of the core material 13 and the mean density thereof, the expansion ratio, and the shapes of the recesses 20. This allows for attaining the sandwich panel 10 with a light weight and a high rigidity.

In the present invention, the skin sheet 12 consists of a sheet made of polyolefin resin such as polypropylene, or engineering plastic. The rigidity of the skin sheet 12 needs to be higher than that of the core material 13, in view of securing the rigidity, the flexural rigidity, in particular, of the sandwich panel 10 as a whole due to the fact that the distance between the skin sheets 12 each of which is provided on the corresponding outer surface of the core material 13, or the thickness of the core material 13, are secured. The skin sheets 12 constitute the upper and lower layer walls, respectively, and a side wall may be preferably defined by integrally welding end portions of the skin sheets 12a, 12b at the outer periphery of the sandwich panel 10 by means of a pinch-off portion 8. A space is formed between the outer peripheral side wall of the sandwich panel 10 and the outer periphery of the core material 13, so that the sandwich panel 10 can be prevented from being deformed due to the difference of the thermal contraction between the skin sheet 12 and the core material 13 after the forming.

More specifically, the skin sheet 12 may be preferably made of resin material with a higher tensile strength in a molten state, in order to prevent variability of the thickness of the skin sheet 12 from being generated due to the draw-down or the sagging phenomenon, while a resin material with a high fluidity may be preferably adopted in order to improve its characteristics in which it is formed along the shape of the mold 50.

More concretely, polyolefin (polypropylene, high-density polyethylene, for instance) which is a homopolymer or copolymer of olefin such as ethylene, propylene, butene, isoprenepentene, methylpentene and a value of MFR (which is measured at 230° C. under the test load of 2.16 kg pursuant to JIS K-7210) of which is less than, or equal to 3.0 g/10 min, more preferably, between 0.3 and 1.5 g/10 min may be adopted.

Alternatively, non-crystalline resin such as copolymer of acrylonitrile butadiene•styrene (ABS resin), polystyrene, high impact polystyrene (HIPS resin), copolymer of acrylonitrile •styrene (AS resin), etc. and a value of MFR (which is measured at 200° C. under the test load of 2.16 kg pursuant to JIS K-7210) of which is between 3.0 and 60 g/10 min, more preferably, between 30 and 50 g/10 min, and a value of MT of which is more than, or equal to 50 mN, more preferably, more than, or equal to 120 mN may be adopted.

In this connection upon MT being measured, a strand is extruded from an orifice with a diameter of 2.095 mm and a length of 8 mm at a preheat temperature of 230° C. under the extruding speed of 5.7 mm/min, and a tension generated on the strand when it is wound up by a roller with a diameter of 50 mm at a winding speed of 100 rpm is measured using a melt tension tester of TOYO SEIKI SEISAKUSHO.

In order to prevent cracks from being generated on the skin sheet 12, less than 30 wt %, more preferably, less than 15 wt % of hydrogenated styrene thermoplastic elastomer may be added. More specifically, a mixture of a block copolymer of styrene ethylene butylene styrene, a block copolymer of styrene-ethylene •propylene-styrene, and hydrogenated styrene-butadiene rubber may be preferable for hydrogenated styrene of the thermoplastic elastomer. Less than 30 wt %, more preferably, less than 20 wt % of styrene may be contained, and the value of MFR (which is measured at a temperature of 230° C. under the test load of 2.16 kg pursuant to JIS K-7210) may be between 1.0 and 10 g/10 min, more preferably, between 1.0 and 5.0 g/10 min.

In addition, additive including inorganic filler such as silica, mica, talc, calcium carbonate, glass fiber, carbon fiber, etc., plasticizer, stabilizer, color, antistatic, flame-retardant, foaming agent may be added to the skin sheet 12, similar to the core material 13.

More specifically, less than or equal to 50 wt %, more preferably, between 30 and 40 wt % of silica, mica, glass fiber, etc. may be added to the resin to be formed.

In a case where the decoration sheet 14 is provided on the surface of the skin sheet 12, the decoration sheet 14 is constituted in order to improve an external appearance and a decorative effect and protect an article which contacts the formed product (in case of the cargo floor board, luggage rested on an upper surface thereof, for instance). Fiber sheet-like skin, film-like skin, etc. is applied to the decoration sheet 14. Such a fiber skin may be made of synthetic fiber such as polyester polypropylene, polyamid, polyurethane, acril, vinylon, semisynthetic fiber such as acetate, rayon, regenerated fiber such as viscose rayon, cuprammonium rayon, etc., natural fiber such as cotton, jute, wool, silk, etc., and blended fiber in which these fiber are blended.

Among these, unwoven fabric consisting of polyester mass per unit area of which is more than 150 g/m$^2$ may be preferable, in view of the feel, the durability and the formability. The tensile strength of the decoration sheet 14 may be preferably higher than, or equal to 15 kg/cm$^2$ and the extensibility thereof may be preferably higher than, or equal to 30%, in view of the reproducibility of three dimensional shape and the molding properties. In this connection, such a tensile strength and extensibility are measured at a temperature of 20° C. pursuant to JIS-K-7113. A thermoplastic elastomer, embossed resin layers, resin layers an outer surface of which a printed layer is attached to, synthetic leather, meshed skin layers with slip resistance, etc. may be used for the sheet-like skin and the film-like skin, instead of the above unwoven fabric.

According to the sandwich panel 10 including the above structure, the weight of the core material 13, and thus, the weight of the sandwich panel 10 can be reduced by providing the core material 13 made of foamed resin, and by providing a plurality of recesses 20, each of which forms an opening 26 on at least one outer surface 22 and inwardly extends to form an inner space closed by the corresponding skin sheet 12.

In such a case, the void volume can be readily varied by adjusting the amount of the foaming agent, and thus, the foams formed inside the core material 13, for example. While on the other hand, the method of forming the core material 13 including recesses 20 can be prevented from being specialized, or complicated by limiting the number, and thus, the volume of the plurality of recesses 20 provided on at least one of the outer surface 22, as compared with a case where the void volume required for reducing the weight is secured only by providing the plurality of recesses 20.

In addition, the planar adhesion of the core material 13 to the corresponding skin sheet 12 can be secured through at least one outer surface 22 under the given void volume allocated to the plurality of recesses 20 in relation with the predetermined expansion ratio. While on the other hand, the number and the total open area of the plurality of recesses 20 can be determined in such a way that the solid portions 19 of the core material 13 made of the foamable resin excluding the void volume formed by the plurality of recesses 20 function to support the compressive load in the thickness direction of the core material 13.

Accordingly, the flexural rigidity or the shear rigidity of the sandwich panel 10 itself can be secured, while the compression rigidity of the core material itself can be maintained, while at the same time the weight of the sandwich panel can be readily reduced.

In more detail, when trying to achieve an entire void volume required for a reduction in weight by using air bubbles formed by foaming alone, since the air bubbles are formed in the thermoplastic resin core, openings associated with the formation of the air bubbles are not formed in at least one surface that forms the bonding surface for the corresponding skin material sheet, whereas the expansion ratio necessarily increases, whereby the compression rigidity of the thermoplastic resin core in the thickness direction is reduced.

On the other hand, when trying to achieve the entire void volume required for a reduction in weight by using the recesses alone, the annular ribs constituting the recesses exercise a support function for a compressive load in the thickness direction of such a thermoplastic resin core, whereas an area of the openings formed in at least one surface increases. As a result, an adhesion area on at least the one surface with respect to the corresponding skin sheet is reduced, whereby the flexural rigidity or the shear rigidity of the entire sandwich panel is lowered.

Therefore, when attaining a reduction in weight of the sandwich panel, appropriately determining the number of the recesses, a size or a shape of each opening constituted of the annular rib, or an annular shape of the annular rib such as a thickness of the annular rib enables achieving both acquisition of the flexural rigidity or the shear rigidity of the entire sandwich panel and acquisition of the compression rigidity of the core itself.

Figure 6:
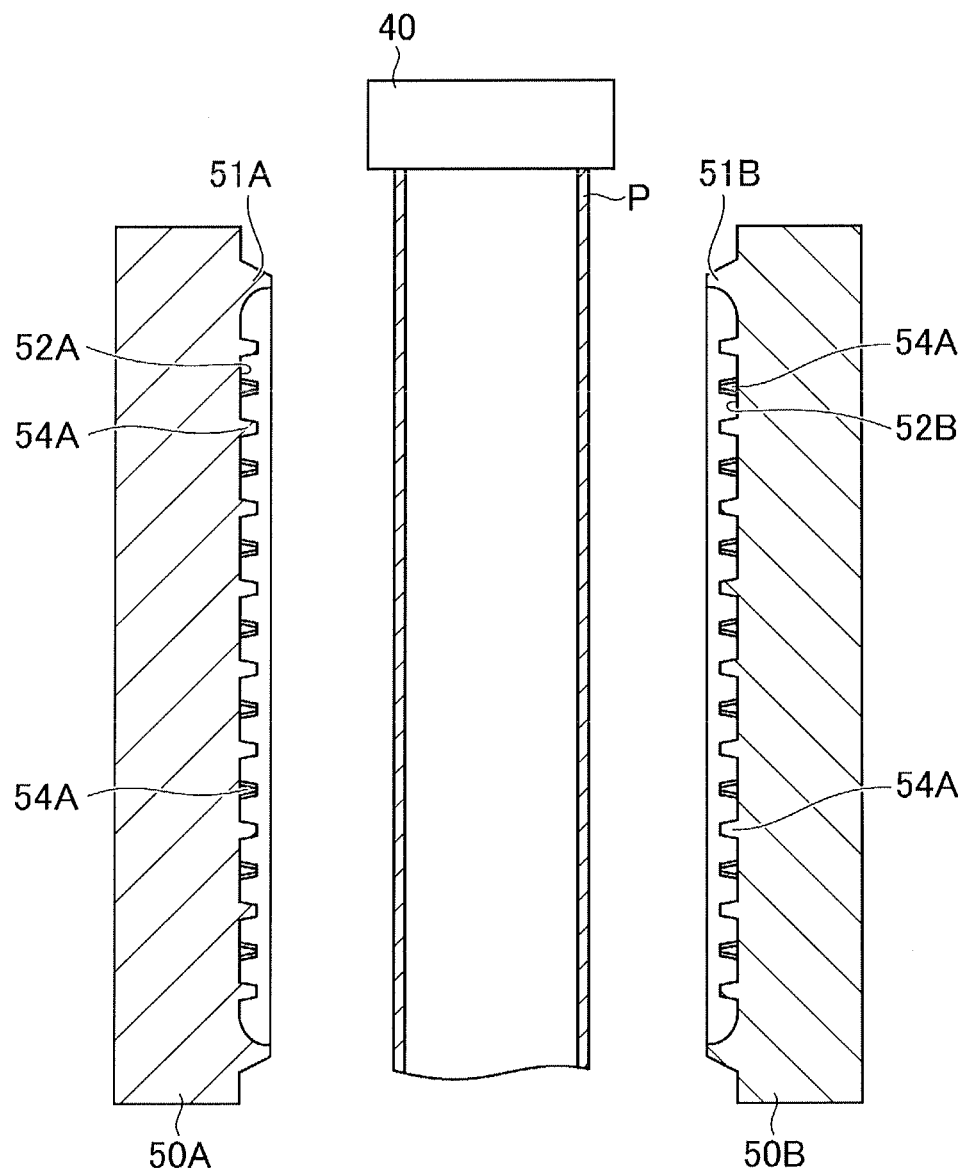
FIG. 6 is a view showing a situation before a step of clamping molds by which the core material for the sandwich panel according to the first embodiment of the present invention is formed.

The extrusion head 40 and the pair of split molds 50 which form the core material 13 including the above structure are both conventional types. As shown in FIG. 6, each of the pair of split molds 50 is disposed in such a way that a cavity 52 of one of the pair of split molds 50 which forms the parison P fed between the pair of split molds 50 is opposed to a cavity 52 of the other of the pair of split molds 50. An annular pinch-off portion 51 is provided on the surface of each cavity 52 along its outer peripheral edge portion. A plurality of protrusions 54 are formed inside each of the pinch-off portion 51. Each of the plurality of protrusions 54 tapers toward the opposed one of the pair of split molds 50 in a convergent manner. This causes the plurality of protrusions 54 to be readily removed from the core material 13 having been formed in a case where the pair of split molds 50 are opened after the core material 13 is formed at a position where the pair of split molds 50 are closed. It is preferable that the tapering angle α be at least more than 75° relative to the longitudinal direction of the core material 13. Each of the plurality of protrusions 54 is shaped to be a truncated pyramid with a regular hexagon bottom. This causes each of the two parisons P in molten states within the pair of split molds 50 to be pressed against the corresponding cavity 52 in a case where the a pair of split molds are closed, whereby the plurality of protrusions 54 are inserted into the surface of each of the two parisons P in molten states opposed to the corresponding cavity 52, and as a result, a plurality of recesses 20, the shape of each of which is complementary to the profile of the corresponding protrusion 54 are formed on the opposed surface.

Next, a method of forming the core material 13 will be explained about.

Firstly, polyolefin resin is fed to the extruder (not shown) to be heated and kneaded until it becomes melted, and then, an amount of the foaming agent is added in the extruder, so that the foamed molten resin is produced in the extruder. Then, the foamed molten resin is fed to the accumulator (not shown) with its temperature being maintained to be suitable for the expansion, while at the same time its pressure being maintained so as not to start the expansion. Then, the foamed molten resin is released in the low pressure zone by pressing a ram (not shown) of the accumulator with the gate of the tip portion of the extruding head 40 being kept open, whereby the foamed tubular parison P is formed. In this connection, the expansion ratio is maintained to be substantially constant during the later forming process by the split molds 50.

As shown in FIG. 6, a tubular parison P in a molten state is vertically and downwardly extruded from a known extrusion head 40 through a slit-die to be fed between the pair of split molds 50 which are opened.

Figure 7:
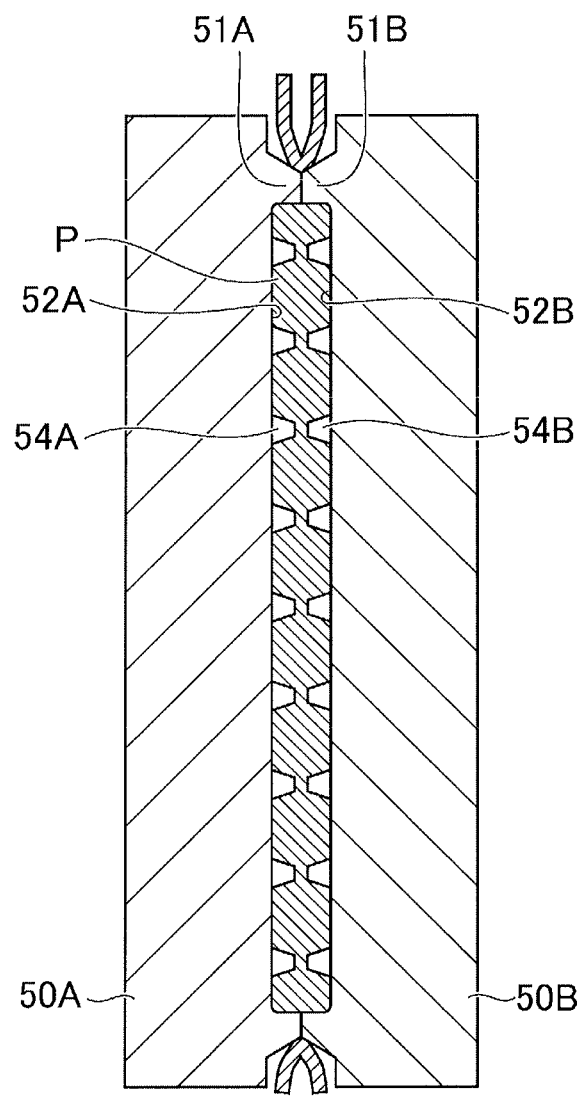
FIG. 7 is a view showing a situation in which the molds by which the core material for the sandwich panel according to the first embodiment of the present invention is formed are clamped.

Then, as shown in FIG. 7, the pair of split molds 50 are moved from an open position to a close position to be clamped. This causes a sealed space to be defined.

Then, the parison P in the sealed space is pressed against the cavity 52 by the blow-molding or the vacuum forming through the sealed space to be formed along the cavity 52.

More specifically, in the case of blow-molding, similar to the conventional process, the parison P is pressed against the cavity 52 by introducing a blow-pin (not shown) into the core material 13 and injecting a pressurized fluid inside of the core material 13, while, in the case of vacuum forming, similar to the conventional process, the parison P is sucked toward the cavity 52 to be pressed against the cavity 52 by providing a flow passage (not shown) communicating with the sealed space inside the pair of split molds 50 and sucking on air within the sealed space via the flow passage.

This allows for the thermoplastic resin plate 16 to be formed based on the continuous tubular parison P in a molten state. The plurality of recesses 20 corresponding to the plurality of protrusions 54 are formed on the surface of each of the pair of thermoplastic resin plates 16 opposed to the corresponding cavity 52 by inserting the plurality of protrusions 54 into the opposed surface. Each of the plurality of recesses 20 is so formed as to protrude at the side of the surface opposite to the opposed surface, that is, an inner surface 18, whereby each of the plurality of recesses 20 is formed with an butt planar portion 24 forming a bottom.

In such a case, the butt planar portion 24 of each of the plurality of recesses 20 on one of the pair of thermoplastic resin plates 16 and the corresponding butt planar portion 24 of each of the plurality of recesses 20 on the other of the pair of thermoplastic resin plates 16 are welded to each other by making an arrangement of the plurality of protrusions 54 on the cavity 52 of one of the pair of split molds 50 same as that on the cavity 52 of the other of the pair of split molds 50. In addition, a parting line PL is formed on peripheral edge portions of the two tubular parisons P to be welded to each other by the fact that pinch-off portions of the pair of split molds 50 abut against each other.

Figure 8:
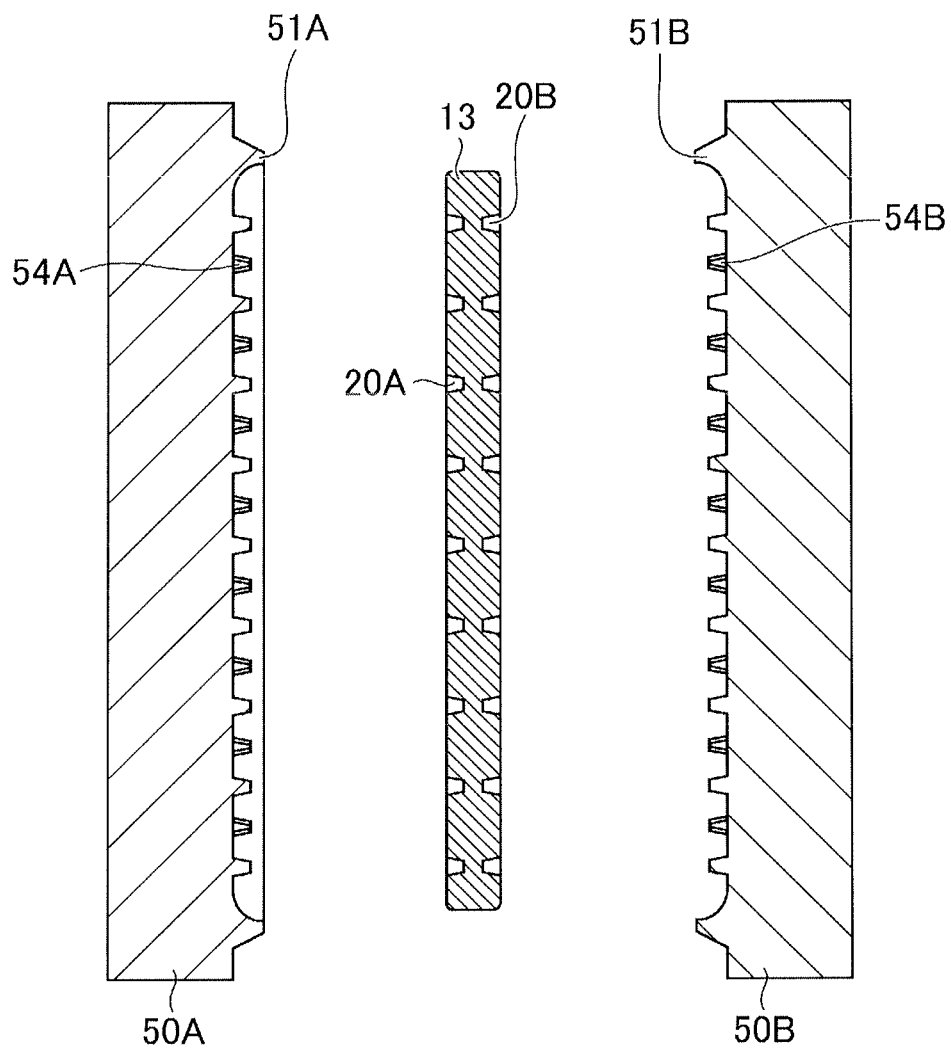
FIG. 8 is a view showing a situation in which the molds by which the core material for the sandwich panel according to the first embodiment of the present invention is formed are opened.

Then, as shown in FIG. 8, the pair of split molds 50 are moved from the close position to the opening position by the mold driving device. Then, the formed core material 13 is removed from the open split molds 50.

This completes the forming of the core material 13.

According to the method of forming the core material of thermoplastic resin for the sandwich panel including the above steps, the expansion ratio can be limited by relying on the void volume formed by the plurality of recesses 20 on the surface of the core material 13, as compared with a case where the weight of the sandwich panel is reduced only by forming infinite number of foams inside the core material 13. This causes a difficulty of an adjustment of the expansion ratio due to the increase of the expansion ratio to be evaded. While on the other hand, good adhesion properties can be secured by welding the core material 13 and the skin sheet 12 using the pair of molds 50. Accordingly, the expansion ratio can be readily adjusted, while at the same time shortage of the strength of the sandwich panel can be prevented from being generated.

Figure 9:
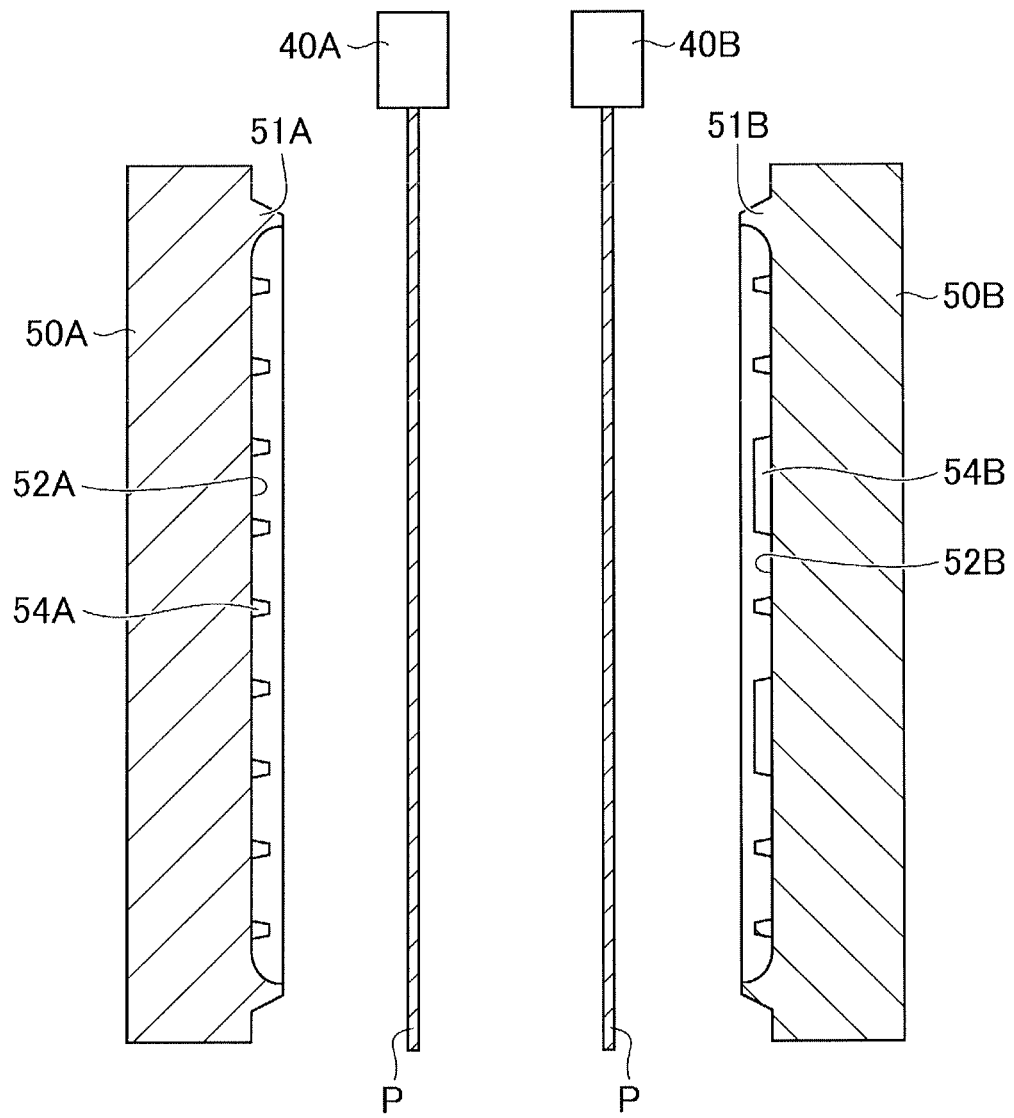
FIG. 9 is a view similar to FIG. 6 showing a situation before a step of clamping the molds by which the core material for the sandwich panel according to another embodiment of the present invention is formed.
Figure 10:
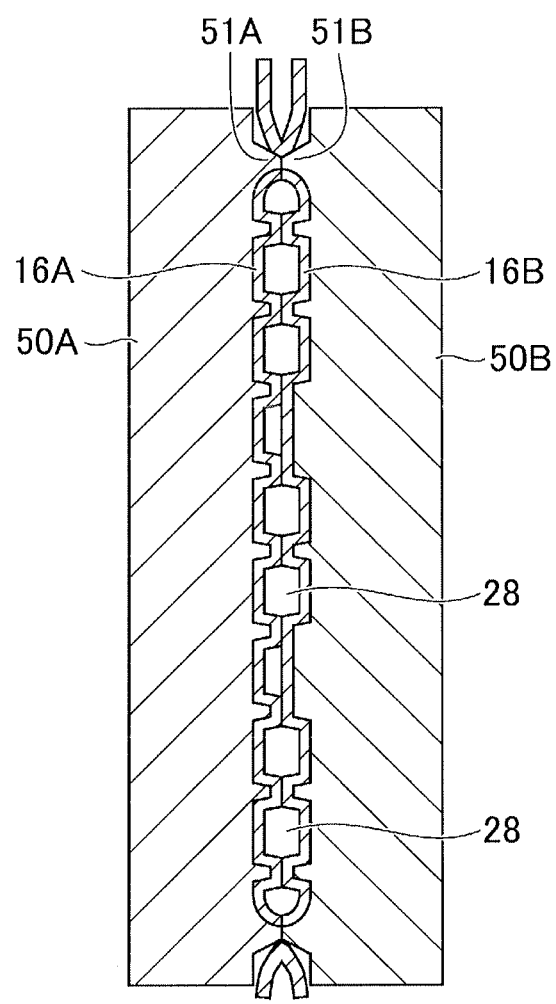
FIG. 10 is a view similar to FIG. 7 showing a situation in which the molds by which the core material for the sandwich panel according to another embodiment of the present invention is formed are clamped.
Figure 11:
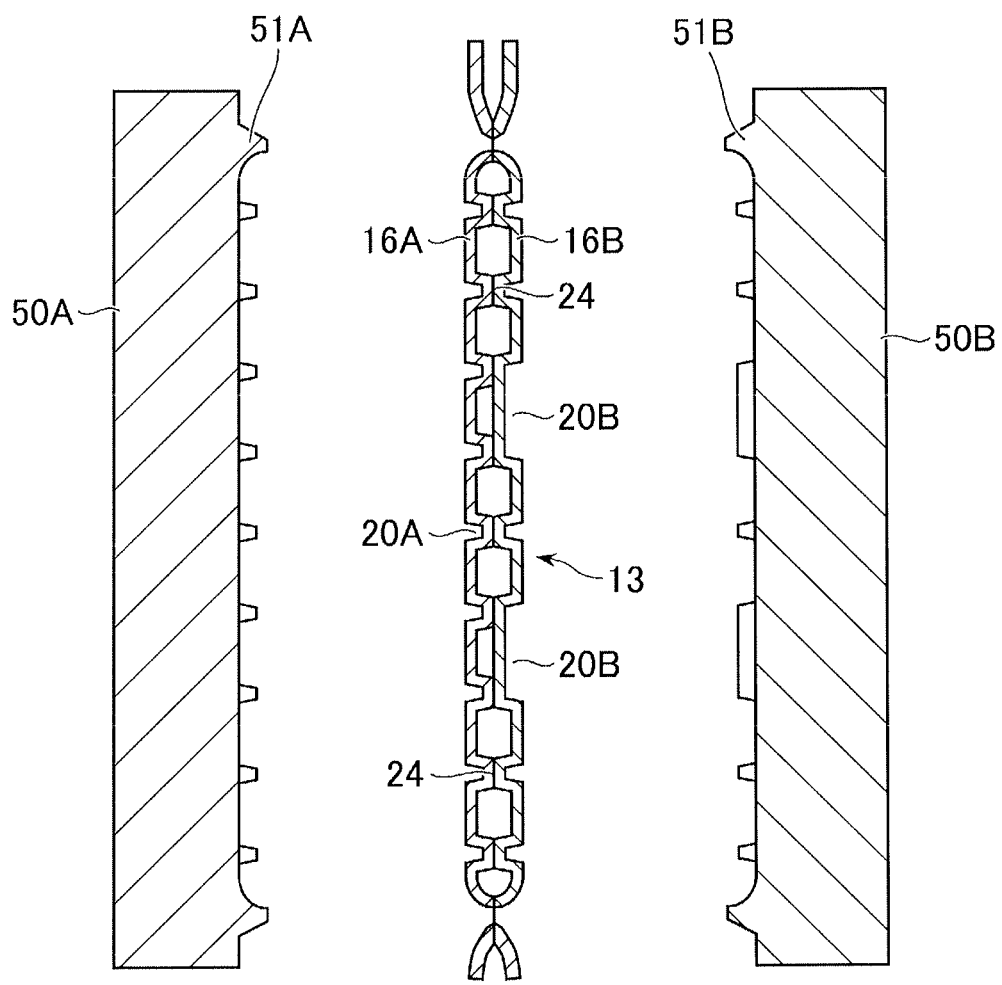
FIG. 11 is a view similar to FIG. 8 showing a situation in which the molds by which the core material for the sandwich panel according to the first embodiment of the present invention is formed are opened.

Each of FIGS. 9 to 11 shows an alternative in which the core material 13 with recesses 20 of different sizes being distributed is provided, whereby the inner structure of the core material 13 varies along its longitudinal direction (vertical direction). In this embodiment, two extrusion heads 40A, 40B each of which extrudes continuous sheet-like parison P are provided. In FIG. 9 to FIG. 11, with respect to the continuous sheet-like parison P on the right side, the recesses 20 of different sizes are unevenly distributed, while, with respect to the continuous sheet-like parison P on the left side, the recesses 20 of the same size are evenly distributed along the longitudinal direction (vertical direction), as in FIGS. 4 to 8.

In view of the above, as shown in FIG. 9 to FIG. 11, the protrusions 54 of different sizes are provided on the cavity 52 of one of the pair of split molds 50 on the right side. More specifically, recesses 20 with comparatively long widths in the longitudinal direction (vertical direction) besides the recesses 20 with a truncated pyramid, similar to FIG. 4 to FIG. 8, are provided. As shown in FIG. 10, recesses 20 with wide butt bottoms are formed on the continuous sheet-like parison P on the right side by the closing of the pair of split molds 50. Two butt bottoms of the recesses 20 which are formed on the continuous sheet-like parison P on the left side abut against one of the butt bottoms on the right side.

According to the core material 13 with the above structure, its heat insulating properties or its sound absorbing qualities can be secured by maintaining the ratio of close-celled foams due to the limitation of the increase of the expansion ratio, while at the same time its local strength can be distributed as desired by varying its inner structure in its longitudinal direction.

As an alternative to the method of forming a core material 13 made of a thermo plastic for a sandwich panel, the foamable parison P in a molten state may be formed before the pair of split molds 50 are closed. More specifically, said method may comprise steps of positioning two sheet-like parisons P made of thermal plastic between a pair of split molds 50 in such a way that said parisons P protrude around cavities 52 of said pair of split molds 50, forming a sealed space between said cavity 52 of each of the pair of split molds 50 and said corresponding sheet-like parison P by bringing said corresponding sheet-like parison P into abutment with a pair of protrusions (not shown) which are disposed to be spaced apart from each other on said cavity 52 and protrude from said cavity 52 toward the other cavity 52, forming said sheet-like parisons P by sucking said sheet-like parisons P through said sealed space to press said sheet-like parisons P against the cavities 52 of said pair of split molds 50, and closing said pair of split molds 50 to weld said two sheet-like parisons P, whereby a sealed hollow portion is formed inside the sheet-like parisons P, while at the same time a plurality of recesses 20 or a plurality of perforated holes are provided on surfaces of said sheet-like parisons P by a parting line PL being formed around peripheral edges of said welded two sheet-like parisons P.

In such a case, said forming step may comprise a step of forming a plurality of recesses 20 corresponding to a plurality of protrusions 54 which are provided on the cavity 52 of at least one of the pair of split molds 50 and each of which tapers so as to converge toward the opposed split mold, on the surface of the corresponding sheet-like parison P by pressing it against said plurality of protrusions 54.

In addition, the plurality of recesses 20 which correspond to the plurality of protrusions may be formed on the surface of the sheet parison P by press by clamping the pair of split molds 50. According to the above method, since the sealed space formed inside the pair of split molds 50 by the clamping does not have to be pressurized, or sucked, an infinite number of foams formed inside the foamable sheet parison P disposed inside the sealed space can be prevented from being collapsed, or the ratio of close-celled foams can be prevented from decreasing due to the fact that the adjacent foams are connected to each other, or the foams can be prevented from being foamed.

So far, with respect to the method of forming the core material 13, the method in which the foamable resin is sandwiched between the pair of split molds to be formed has been explained. Alternatively, the core material 13 may be produced by a known method such as so-called expansion injection molding, or foamed resin beads molding in which the foamable resin is injected into the inside of the clamped pair of split molds, or the inside of the clamped pair of split molds is filled with the foamable resin.

Next, an apparatus and a method of forming a sandwich panel 10 using a mold based on the above formed core material 13 will be explained about.

Figure 12:
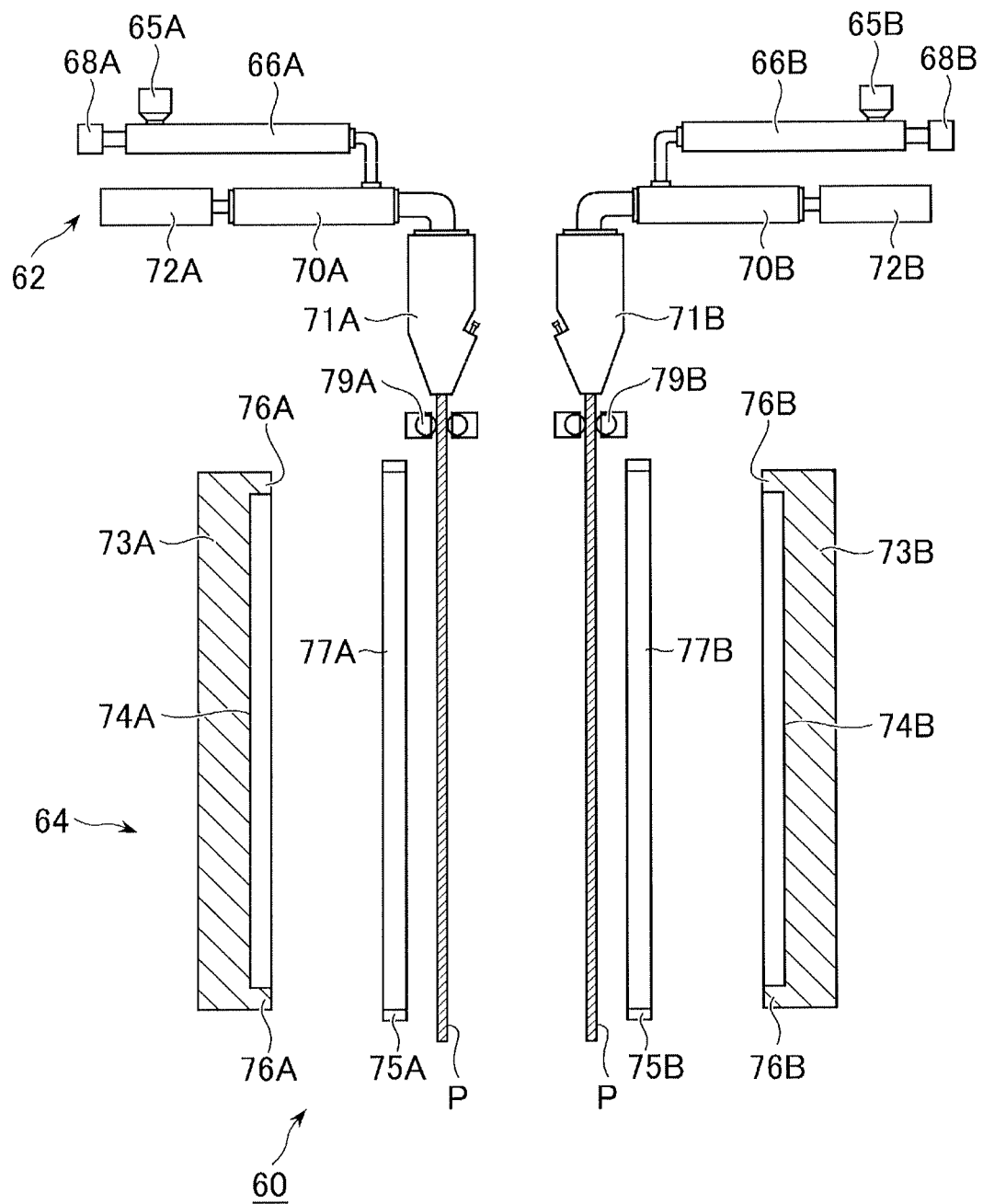
FIG. 12 is a general view showing an apparatus for forming the core material for the sandwich panel 10 according to the first embodiment of the present invention.

As show in FIG. 12, the apparatus 60 for forming the sandwich panel comprises an extrusion device 62 and a clamping device 64 disposed to be below the extrusion device 62. A parison P in a molten state extruded from the extrusion device 62 is adapted to be fed to the clamping device 64 by which the parison P is formed.

The extrusion device 62 is of the conventional type, so that the detailed explanation thereabout is omitted. The extrusion device 62 comprises a cylinder 66 on which a hopper 65 is provided, a screw (not shown) provided inside the cylinder 66, a hydraulic motor 68 connected to the screw, an accumulator 70 the inside of which communicates with the cylinder 66, and a plunger 72 provided inside the accumulator 70. Resin pellet from the hopper 65 is fused and mixed in the cylinder 66 by the rotation of the screw driven by the hydraulic motor 68, and then, the resin in a molten state is transported to the accumulator 70 where a predetermined amount of resin is stored. Then, the resin in a molten state is fed to a T-die 71 by the drive of the plunger 72, whereby a continuous sheet-like parison P is extruded through a die-slit (not shown) to be downwardly fed being sandwiched by a pair of rollers 79 disposed to be apart from each other, and as a result, it is positioned between the pair of split molds 50 in a suspended form. This allows for the sheet-like parison P to be disposed between the pair of split molds 50 being tensed without generating wrinkles or sagging.

The extruding capacity of the extrusion device 62 may be appropriately selected in view of the expansion ratio to be attained, the ratio of close-celled foams, as well as the size of the skin sheet to be formed and the prevention of the generation of the draw-down phenomenon of the parison P. More specifically, since, if the extruding speed at which the resin is extruded from the die slit is too high, the expansion ratio becomes small while the ratio of close-celled foams decreases, while on the other hand, if the extruding speed at which the resin is extruded from the die slit is too low, the resin becomes foamed too much while the ratio of close-celled foams decreases, the extruding speed needs to be determined in view of the functions required for the core material 13, its strength, heat insulating or sound absorbing properties, in particular. In addition, from a practical point of view, the extrusion speed at which the resin is extruded from the die-slit may be preferably higher than several hundreds kg/hour, more preferably, higher than 700 kg/hour. In addition, in view of the prevention of the generation of the draw-down phenomenon of the parison P, the time period of the process of extruding the parison P may preferably be as short as possible. More specifically, although it depends on the kind of the resin and the value of MFR, in general, it may be within 40 seconds, more preferably, within 30 seconds. In view of the above, the amount of the extrusion of the thermoplastic resin from the die-slit per unit area and unit time may preferably be more than 50 kg/hour/cm$^2$, more preferably, more than 50 kg/hour/cm$^2$.

The die-slit is disposed to be vertically and downwardly oriented, so that the continuous sheet-like parison P extruded from the die-slit is adapted to be vertically and downwardly fed as it is being suspended from the die-slit. The width of the die-slit can be changed so that the thickness of the continuous sheet-like parison P can be varied.

On the other hand, the clamping device 64 is also of the conventional type, like the extrusion device 62, so that the detailed explanation thereabout is omitted. The clamping device 64 comprises a pair of split molds 73 and a mold driving device which moves the pair of split molds 73 between an open position and a close position in the direction substantially perpendicular to that in which the continuous sheet-like parison P in a molten state is fed.

The pair of split molds 73 are disposed in such a way that the cavities 74 of the pair of split molds 73 are opposed to each other. Each of the cavities 74 are disposed to be vertically and downwardly oriented. An irregular portion is provided on the surface of each of the cavities 74, or inside an annular pinch-off portion 76 of each of the cavities 74 which is to be described below, in accordance with the profile and the pattern of the skin sheet 12 to be formed based on the continuous sheet-like parison P.

A pinch-off portion 76 is formed around the cavity 74 in each of the pair of split molds 73. The pinch-off portion 76 is formed to be annular around the cavity 74 and protrudes toward the opposed mold 73. This allow for a parting line PL to be formed around the peripheral edge of the parison P in a molten state by the fact that tip ends of the respective pinch-off portions 76 abut against each other when the pair of split molds 73 is closed.

A pair of frame members 75 are disposed substantially in parallel with the cavities 74 between the pair of split molds 73 in a telescoped manner. Each of the pair of frame members 75 includes an opening 77 and is moved horizontally by a frame member driving device (not shown). This allows for each of the pair of frame members 75 to move toward the corresponding parison P in a molten state, thereby causing the parison P to be held, and then, to reversely move while the parison P is held until the tip end of the pinch-off portion 76 of the corresponding mold 73 abuts against the surface of the parison P through the opening 76.

The mold driving device is of the conventional type, so that the detailed explanation thereabout is omitted. Each of the pair of split molds 73 is driven by the mold driving device in such a way that two continuous sheet-like parisons P in molten states can be disposed between the pair of split molds 73 to be spaced apart from each other at the open position, while the pinch-off portions 76 of the pair of split molds 73 abut against each other at the close position, so that a sealed space is formed inside the pair of split molds 73 by the annular pinch-off portions 76 abutting against each other. In this connection, with respect to the movement of each of the pair of split molds 73 between the open position and the close position, the close position is set to be a center line of the two sheet-like parisons P in molten states, so that each of the pair of split molds 73 is adapted to move toward the center line by the mold driving device.

Next, a method of forming the sandwich panel 10 will be explained about.

Figure 13:
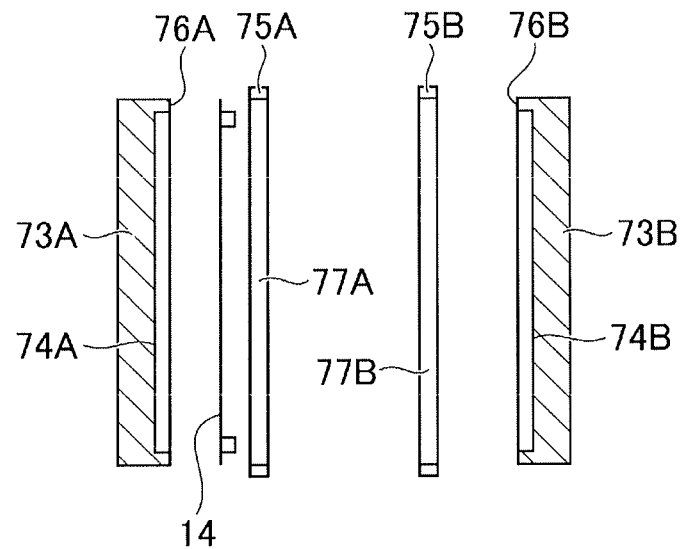
FIG. 13 is a view showing a situation in which a decoration sheet 14 is positioned between the pair of split molds in the process of forming the sandwich panel 10 according to the first embodiment of the present invention.

Firstly, as shown in FIG. 13, a decoration sheet 14 is inserted between one of the pair of split molds 73 and the corresponding one of the pair of frame members 75 from the side of the pair of split molds 73, and the sheet-like decoration sheet 14 is temporarily fixed so as to cover the cavity 74 of one of the pair of split molds 73 by a pin (not shown) provided on one of the pair of split molds 73.

Figure 14:
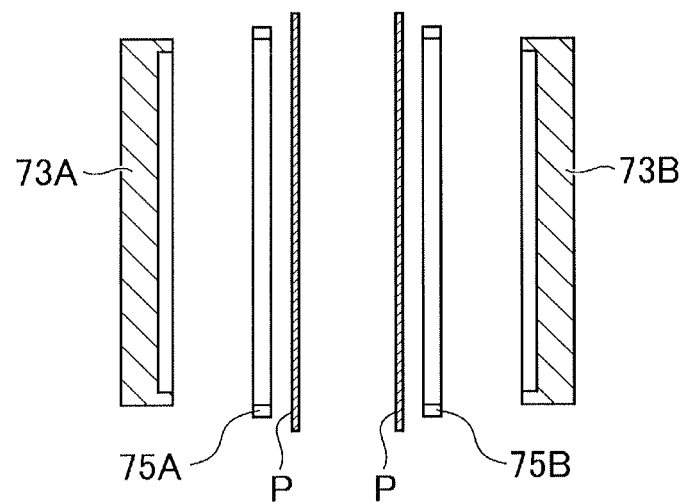
FIG. 14 is a view showing a situation in which a skin sheet is positioned between the pair of split molds in the process of forming the sandwich panel 10 according to the first embodiment of the present invention.

Then, as shown in FIG. 14, each of two continuous sheet-like thermoplastic resin parisons P in molten states is vertically and downwardly extruded from the corresponding die-slit to be fed between the pair of split molds 73, while each of the pair of the frame members 75 is moved toward the corresponding parison P by the frame member driving device.

Figure 15:
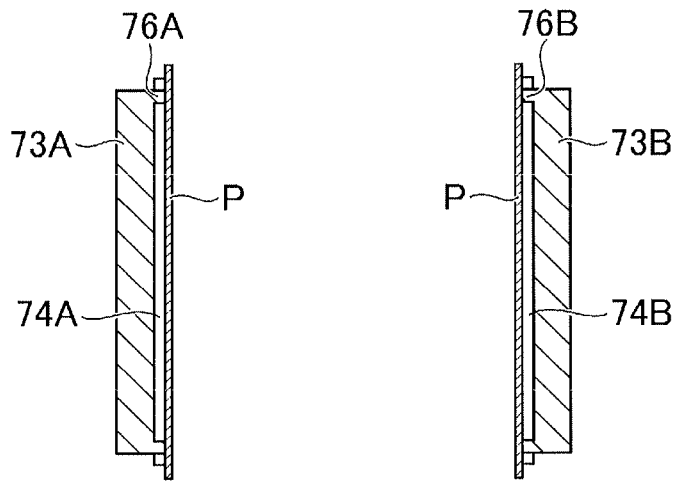
FIG. 15 is a view showing a situation in which the skin sheet abuts against the pair of split molds in the process of forming the sandwich panel 10 according to the first embodiment of the present invention.

Then, as shown in FIG. 15, each of the pair of the frame members 75 holding the corresponding parison P is moved toward the corresponding one of the pair of split molds 73 until the surface of the corresponding parison P opposed to the corresponding cavity 74 is brought into an abutment against the corresponding pinch-off portion 76 through its opening 77. This causes a sealed space to be formed by the surface of the parison P opposed to the cavity 74, the pinch-off portion 76 and the cavity 74.

Figure 16:
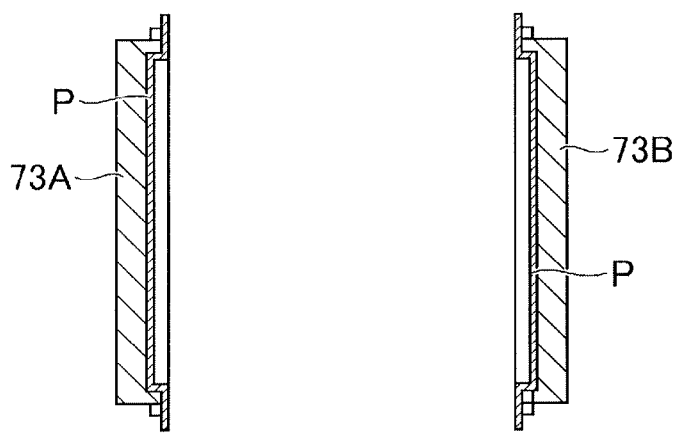
FIG. 16 is a view showing a situation in which the skin sheet is formed in the process of forming the sandwich panel 10 according to the first embodiment of the present invention.

Then, as shown in FIG. 16, air within the sealed space is sucked through each of the pair of split molds 73, so that each of the continuous sheet-like parisons P is pressed against the corresponding cavity 74 and thus, to be formed along the cavity 74. In this connection, the continuous sheet-like parison P on the left side in FIG. 16 is not only formed, but also welded to the decoration sheet 14 interposed between the parison P and the corresponding cavity 74.

Figure 17:
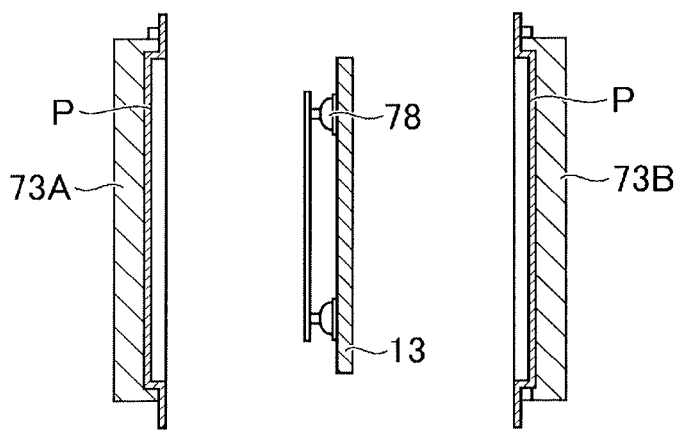
FIG. 17 is a view showing a situation in which the core material is positioned between the pair of split molds in the process of forming the sandwich panel 10 according to the first embodiment of the present invention.

Then, as shown in FIG. 17, the core material 13 held by a suction pad 78 of a manipulator (not shown) is introduced between the pair of split molds 73 from the side.

Figure 18:
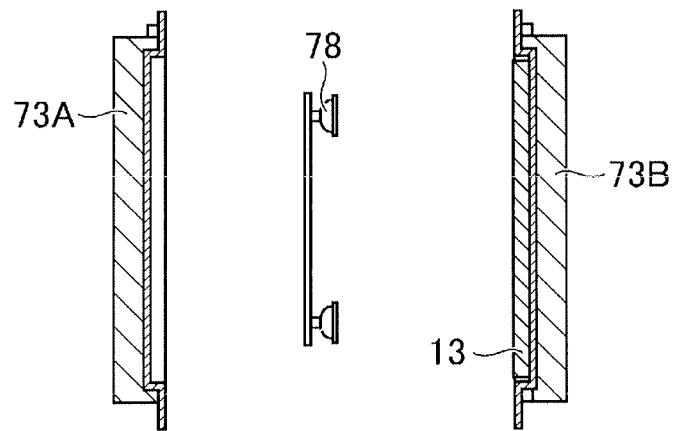
FIG. 18 is a view showing a situation in which the core material is pressed against one of the skin sheets in the process of forming the sandwich panel 10 according to the first embodiment of the present invention.

Then, as shown in FIG. 18, the core material 13 is pressed against the parison P sucked and thus held by the cavity 74 of one of the pair of split molds 73 on the right side by horizontally moving the manipulator toward one of the pair of split molds 73 on the right side. This causes the core material 13 to be welded to the parison P. Then, the suction pad 78 is detached from the core material 13, while the manipulator is removed from between the pair of split molds 73, which completes a preparation for the closing the molds 73.

Figure 19:
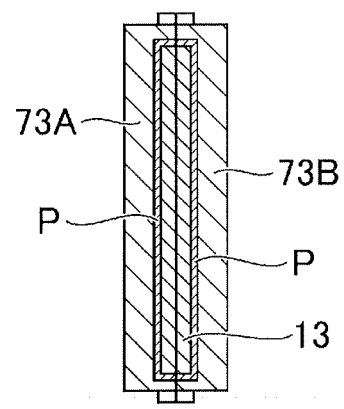
FIG. 19 is a view showing a situation in which the pair of split molds are clamped in the process of forming the sandwich panel 10 according to the first embodiment of the present invention.

Then, as shown in FIG. 19, the pair of split molds 73 are closed and thus clamped by moving the pair of split molds 73 toward each other from the open position to the close position. This causes the core material 13 welded to one of the parisons P (one on the right side in FIG. 19) to be welded to the other of the parisons P, while causing a parting line PL to be formed by the peripheral edges of the parisons P being welded to each other. In this connection, upon the closing of the molds 73, since, unlike the skin sheet 12, the core material 13 which has been already formed to become a cold state, is welded to the skin sheet 12 in a molten state, the core material 13 itself is adapted to be so positioned as not to be deformed by the closing.

Figure 20:
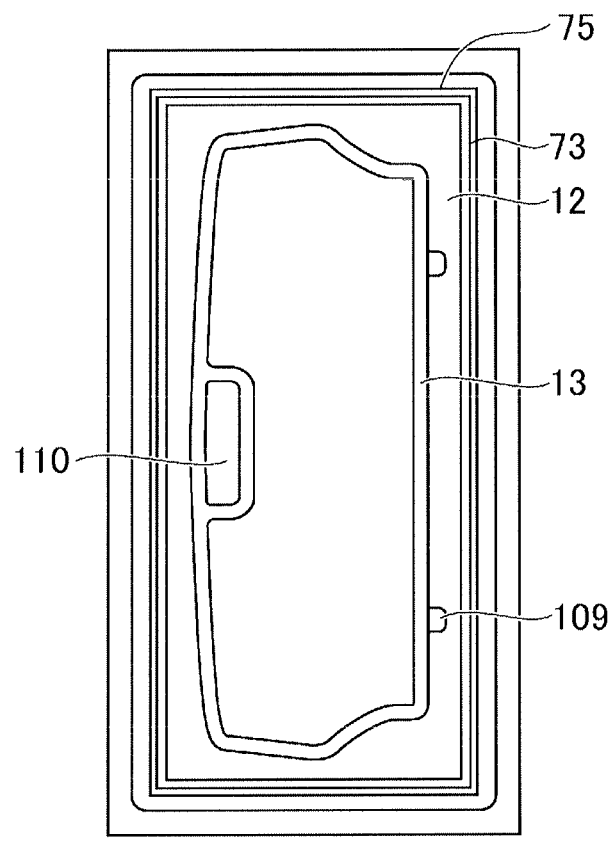
FIG. 20 is a front view showing a cavity of one of the pair of split molds in the apparatus for forming the sandwich panel 10 according to the first embodiment of the present invention.

The above processes completes the sandwich panel 10 in which the decoration sheet 14, the skin sheet 12, the core material 13, and the skin sheet 12 are laminated. FIG. 20 is a front view seen from the cavity 74 of one of the pair of split molds 73 showing the formed skin sheet 12 and the welded core material 13. Reference numbers 109 and 110 indicate a portion of the cavity 74 forming a protrusion and a portion of the cavity 74 forming a grip, respectively. The shape of the core material 13 is a bit smaller than that of the cavity to evade the portion of the cavity 74 forming a grip.

Figure 21:
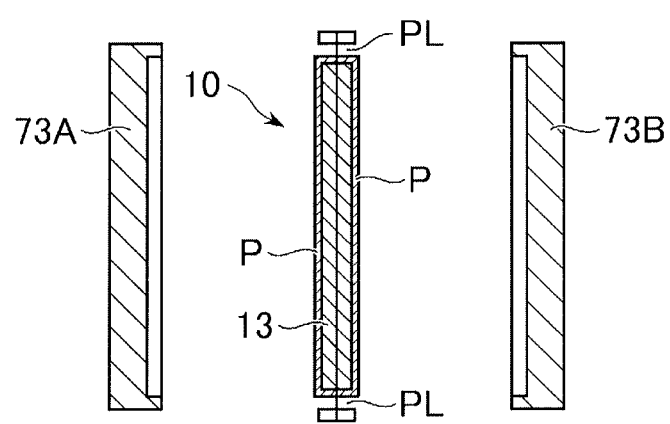
FIG. 21 is a view showing a situation in which the pair of split molds are opened in the process of forming the sandwich panel 10 according to the first embodiment of the present invention.

Then, as shown in FIG. 21, the pair of split molds 73 are opened, so that each of the cavities 74 is separated from the completed sandwich panel 10, and then, flashes formed around the parting line PL are removed.

As stated above, the forming of the sandwich panel 10 is completed.

As described above, the preferred embodiments of the present invention were described in detail, however, it is evident that those skilled in the art could modify or change the embodiments in various manners without departing from the scope of the present invention.

For instance, in the first embodiment, the core material 13 constituting the sandwich panel 10 consists of the pair of the thermal plastic resin plates 16 each of which is formed based on the continuous tubular parison P in a molten state, the tubular or the sheet-like discrete parison P in a molten state may be utilized.

In addition, in the above embodiment, each of the pair of thermoplastic resin plates 16 was formed based on the thermoplastic resin parison P in a molten state using the pair of split molds 50 by the blow molding or the vacuum forming, it may be formed using the pair of split molds 50 by the sheet forming (compression forming), so long as the firm adhesion properties between the pair of thermoplastic resin plates 16 is maintained.

Further, in the first embodiment, the core material 13 consists of the pair of thermoplastic resin plates 16 each of which includes a plurality of recesses 20 on the one surface, and each of the plurality of recesses 20 protrudes at the other surface, so that the butt planar portion 24 of each of the plurality of recesses 20 on the one of the pair of thermoplastic resin plates 16 is welded to the corresponding butt planar portion 24 of each of the plurality of recesses 20 on the other of the pair of thermoplastic resin plates 16, the plurality of recesses 20 on the one of the pair of thermoplastic resin plates 16 does not have to abut against those on the other of the pair of thermoplastic resin plates 16, so long as the firm adhesion properties between the pair of thermoplastic resin plates 16 is maintained.

Still further, in the above embodiment, each of the pair of thermoplastic resin plates 16 includes the plurality of recesses 20 on the one surface, each of the plurality of recesses 20 does not have to protrude at the other surface so that the butt planar portions 24 on one of the pair of thermoplastic resin plates 16 are not welded to those on the other thereof.

Still further, in the sandwich panel 10 used for the cargo floor board of the first embodiment, the decoration sheet 14 is attached to the skin sheet 12 on the face side exhibiting an external appearance, the decoration sheet 14 may be omitted, so that the skin sheet 12 on the face side may be exhibited outside.

Still further, the sandwich panel 10 may be used for inner panel for an automobile such as a foot rest, a side door trim, a seat back, a rear parcel shelf, a door panel, a cushion seat, etc., a carrying case for a machine or a tool, a part of a weak current electrical appliance, a building inner panel such as a wall member, a partition, etc., furniture such as a chair, a tank, a dust, a casing, a housing, a tray, and a container.

The present inventor confirmed by a test a feasibility of a practical formability of the sandwich panel of the so-called hybrid type on the surface of the foamed core material of which a plurality of recesses are provided.

EXAMPLE 1

A propylene homopolymer (manufactured by SunAllomer Ltd., PF814) in which a long chain branching structure having an MFR of 3.0 g/min at 230° has been introduced was used as a thermoplastic resin, 3 parts by weight of talc MB were added as an foaming agent and a nucleating agent to the propylene homopolymer and kneaded by an extruder, then the kneaded material was stored in an in-die accumulator which is a cylindrical space between a mandrel and a die outer cylinder, the kneaded material was extruded into split molds as a cylindrical parison by using a ring-like piston, and air is blown into the parison under the pressure of 0.1 MPa after mold clamping, thereby obtaining a core 13 (Sample 1) with a thickness of 15 mm having a plurality of recesses 20 each formed of a regular hexagon approximately 4 mm on a side and a hollow portion 19. The MFR is obtained by performing measurement with a test load of 2.16 kg based on JIS K-7210. As the accumulator used in the present invention, an accumulator having an injection ratio of 200 cm$^3$/sec or above or preferably 500 cm3/sec or above is adopted.

The core 13 obtained based on Example 1 has a mean density of 0.1 g/cm$^3$ (nine-fold when converted into an expansion ratio) and an effective density of 0.06 g/cm$^3$ (corresponding to 15-fold when converted into the expansion ratio).

EXAMPLE 2

Except for the fact that the parison is closely attached on the cavity of the mold by sucking air between the parison and the mold without blowing air into the parison after the clamping of the molds, a solid core 13 (Sample 2) with a thickness of 15 mm having a plurality of recesses 20 each formed of a regular hexagon approximately 4 mm on a side was obtained by the same method as that of the Example 1. The core 13 obtained based on Example 2 has a mean density of 0.1 g/cm$^3$ (nine-fold when converted into an expansion ratio) and an effective density of 0.08 g/cm$^3$ (corresponding to 11-fold when converted into the expansion ratio).

EXAMPLE 3

Except for the fact that the amount of the foaming agent is reduced, a solid core 13 (Sample 3) with a thickness of 15 mm having a plurality of recesses 20 each formed of a regular hexagon approximately 4 mm on a side was obtained by the same method as that of the Example 2. The core 13 obtained based on Example 3 has a mean density of 0.13 g/cm$^3$ (sevenfold when converted into an expansion ratio) and an effective density of 0.11 g/cm$^3$ (corresponding to eightfold when converted into the expansion ratio).

Then, a crystallized ethylene-propylene copolymer (manufactured by JAPAN POLYCHEM CORPORATION, NOVATEC PP EC9) having an MFR of 0.5 g/min at 230° was used as a thermoplastic resin, and 30 wt % of talc MB was mixed as a filler to the copolymer and then, the mixed material was extruded from T-dies as two sheets, followed by the fact that the core material 13 was sandwiched by the two sheets by clamping the split molds, so that the sandwich panel 10 was removed from the split molds after cooling.

As stated above, the feasibility of the practical formability of the so-called hybrid sandwich panel was confirmed.

The present inventor confirmed an influence of the plurality of recesses provided on the outer surface of the foamed core material on the compression rigidity of the core material.

(1) Specification of Core Material

Five kinds of samples (samples 1 to 5) were prepared. Samples 1 to 3 obtained from Examples 1 to 3 were used. With respect to samples 4 and 5, the expansion was carried out inside the mold using the foamed resin beads, so that a foamed plate made of commercially available polypropylene (EPP) with the thickness of 15 mm was obtained. The foamed plates with the expansion rates of 15-fold and 11-fold were named as samples 4 and 5, respectively.

(2) Test Method

With respect to each of the samples, the effective density in which the volumes of the recesses and the hollow portions were included was measured, and the compressive strength of the core material was measured in pursuant to JIS K7220 using a test piece which was obtained by cutting each of samples into 10 mm×10 mm (the thickness of 15 mm). The result of the measure is shown in Table 1.

(3) Test Results

In Table 1, as clearly seen from the comparison between Samples 2 and 3, the higher the expansion ratio becomes, the smaller the compression strength of the core material becomes. As clearly seen from the comparison between Samples 1 and 4, and the comparison between Samples 2 and 5, if the effective density is constant, the compression strength of the core material becomes high due to the existence of the recesses.

As stated above, in a case where the core material is reduced by adopting so-called hybrid core material in which infinite foams are provided inside the core material by the expansion action, while at the same time a plurality of recesses are provided on its outer surface, it was found out to be effective to provide voids in the form of a plurality of recesses or recesses, in view of securing the compression rigidity of the core material itself, in a case where the total void volume is to be allocated to the void volume constituted by the infinite foams and those constituted by the plurality of recesses or dents.

TABLE 1

| | Effective density (g/cm3) | Compressive Strength (MPa) |
|---|---|---|
| Sample 1 | 0.06 | 0.28 |
| Sample 2 | 0.08 | 0.39 |
| Sample 3 | 0.11 | 0.43 |
| Sample 4 | 0.06 | 0.21 |
| Sample 5 | 0.08 | 0.25 |

EXPLANATION OF REFERENCE NUMBERS

P: parison
PL: parting line
α: tapering angle
10: sandwich panel
12: skin sheet
14: core material
16: thermoplastic resin plate
18: inner surface
20: recess
21: annular rib
22: outer surface
24: butting portion
26: opening
40: extruding head
50: mold
52: cavity
54: protrusion
56: apparatus for forming sandwich panel
62: extruder
64: clamping device
66: cylinder
68: hydraulic motor
70: accumulator
72: plunger
73: mold 74: cavity
76: pinch-off portion
77: opening
78: sucking pad
80: peripheral edge
82: space
100: cargo floor lid
102: small curved portion
103: protrusion
104: large curved portion
106: protrusion
108: concave portion
109: protrusion forming portion
110: mold protrusion for forming grip

What is claimed is:

1. A sandwich panel comprising two resin skin sheets, and a resin core material sandwiched between the two resin skin sheets and planarly adhered to each of the two resin skin sheets, wherein:
   said resin core material comprises a pair of foamed thermoplastic resin plates with a predetermined expansion ratio, each of the plates having a surface, a portion of which has a plurality of recesses and a portion of which has no recesses, the portion of the surface on which no recesses are formed defining a welding surface,
   each of the recesses protrudes inwardly in a truncated conical form in a thicknesswise direction from an opening in the surface of the plate to an opposite surface of the plate to define an annular rib surrounding a hollow inner space closed at the opening by the corresponding skin sheet, and each of said plurality of recesses inwardly tapers in a converging manner and is constituted by said annular rib protruding at its inner surface side,
   and a substantial thickness of the core material being constituted by a protruding height formed by each of all or part of the plurality of recesses on the surface of one of the plates abutting against the corresponding one of the plurality of recesses on the surface of the other of the plates, the rigidity of the resin skin sheets is set to be higher than that of the resin core material,
   each of said plurality of recesses includes an abutting portion at the most converged portion, whereby said core material is formed by welding the abutting portion of each of the plurality of recesses of one of the pair of the resin plates and that of the corresponding recess of the other of the pair of the resin plates, and the surface of each of said pair of the thermoplastic resin plates is joined to the corresponding skin sheet,
   the number and the annular shapes of said annular ribs are such that the planar adhesion of at least one surface of the resin core material to the corresponding skin sheet is maintained, while at the same time said annular ribs function to support a compressive load in the thickness direction of the resin core material, under the predetermined void volume allocated to said plurality of recesses in relation with said predetermined expansion ratio, and
   the relationship between the mean density (x) of said thermoplastic resin core material and the effective density (y) thereof meets the equation $$0.05x \leq y \leq 0.85x$$

and the expansion ratio of said thermoplastic resin core material is less than, or equal to 10-fold.

2. The sandwich panel according to claim 1, wherein each of said plurality of recesses includes a bottom, said abutting portion includes a plane abutting portion, and said core material is formed by welding the plane abutting portion of each of said plurality of recesses of one of said pair of resin plates to that of the corresponding recesses of the other of said pair of resin plates in a back to back configuration.

3. The sandwich panel according to claim 2, wherein each of said plurality of recesses is shaped to be a truncated pyramid which includes a regular hexagon opening on an outer surface of said thermoplastic core material.

4. The sandwich panel according to claim 3, wherein said plurality of recesses are disposed to be in a honeycomb pattern on said outer surface of the thermoplastic core material.

5. The sandwich panel according to claim 1, wherein said abutting portion is formed by a peripheral portion of an opening formed on each of the surfaces opposed to each other of the pair of resin plates, said core material includes perforated holes and formed by welding the abutting portion of each of said plurality of recesses of one of said pair of resin plates to that of the corresponding recess of the other of said pair of resin plates in a back to back configuration.

6. The sandwich panel according to claim 1, wherein the expansion ratio of said thermoplastic resin core material is less than, or equal to 5-fold.

* * * * *